(12) United States Patent
Guan et al.

(10) Patent No.: US 11,018,813 B2
(45) Date of Patent: *May 25, 2021

(54) UPLINK CONTROL INFORMATION TRANSMISSION METHOD AND APPARATUS

(71) Applicant: HUAWEI TECHNOLOGIES CO., LTD., Guangdong (CN)

(72) Inventors: Lei Guan, Beijing (CN); Yongxia Lyu, Ottawa (CA); Jiehua Xiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,620

(22) Filed: Sep. 30, 2019

(65) Prior Publication Data

US 2020/0028634 A1 Jan. 23, 2020

Related U.S. Application Data

(63) Continuation of application No. 15/892,602, filed on Feb. 9, 2018, now Pat. No. 10,484,149, which is a
(Continued)

(30) Foreign Application Priority Data

Aug. 10, 2015 (WO) ................ PCT/CN2015/086538

(51) Int. Cl.
*H04W 72/02* (2009.01)
*H04L 1/18* (2006.01)
(Continued)

(52) U.S. Cl.
CPC .......... *H04L 1/1887* (2013.01); *H04L 1/1829* (2013.01); *H04L 1/1854* (2013.01);
(Continued)

(58) Field of Classification Search
CPC ... H04L 1/1829; H04L 1/1854; H04L 1/1864; H04L 1/1887; H04L 1/1896;
(Continued)

(56) References Cited

U.S. PATENT DOCUMENTS

2012/0182914 A1* 7/2012 Hariharan ............. H04L 1/1614
370/311
2013/0021921 A1* 1/2013 He ........................ H04L 5/0055
370/242

(Continued)

FOREIGN PATENT DOCUMENTS

CN 102598572 A 7/2012
CN 103069736 A 4/2013
(Continued)

OTHER PUBLICATIONS

Lenovo,"HARQ-ACK codebook determination for Rel-13 eCA",3GPP TSG RAN WG1 Meeting #82 R1-154503,Beijing, China, Aug. 24-28, 2015,total 4 pages.
(Continued)

*Primary Examiner* — Phuc H Tran
(74) *Attorney, Agent, or Firm* — Gregg L. Jansen

(57) ABSTRACT

A terminal receives downlink scheduling information of a downlink subframe F(i, j), where a set M of preconfigured downlink subframes in which the downlink subframe F(i, j) is located is divided into N subsets of preconfigured downlink subframes, a bit quantity of a hybrid automatic repeat request-acknowledgement HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different. The terminal generates a HARQ-ACK codebook according to a receiving status of downlink data. And the terminal generates uplink control
(Continued)

information after encoding the HARQ-ACK codebook; and a sending module sends the uplink control information.

22 Claims, 16 Drawing Sheets

Related U.S. Application Data continuation of application No. PCT/CN2015/086692, filed on Aug. 11, 2015.

(51) Int. Cl.
   *H04L 5/00* (2006.01)
   *H04W 72/04* (2009.01)
   *H04W 72/12* (2009.01)

(52) U.S. Cl.
   CPC .......... *H04L 1/1864* (2013.01); *H04L 1/1896* (2013.01); *H04L 5/0055* (2013.01); *H04W 72/0413* (2013.01); *H04W 72/1284* (2013.01)

(58) Field of Classification Search
   CPC ... H04L 5/0055; H04L 1/1812; H04L 5/0053; H04L 1/1819; H04L 1/1861; H04L 5/00; H04L 1/18; H04L 5/0048; H04L 1/1671; H04L 5/001; H04L 5/0007; H04L 5/0094; H04L 27/26; H04L 1/1614; H04L 5/0092; H04L 1/0003; H04L 1/0026; H04W 72/0413; H04W 72/1284
   See application file for complete search history.

(56) References Cited

U.S. PATENT DOCUMENTS

| | | | | |
|---|---|---|---|---|
| 2013/0170407 A1* | 7/2013 | Liang | .................... | H04L 1/1861 |
| | | | | 370/280 |
| 2013/0315176 A1* | 11/2013 | Berggren | .............. | H04L 1/1692 |
| | | | | 370/329 |
| 2013/0343238 A1* | 12/2013 | Seo | ........................ | H04L 5/0053 |
| | | | | 370/280 |
| 2014/0119249 A1* | 5/2014 | Park | ...................... | H04L 5/0055 |
| | | | | 370/280 |
| 2016/0066343 A1* | 3/2016 | Lin | ........................ | H04L 5/0044 |
| | | | | 370/280 |
| 2016/0344515 A1* | 11/2016 | Aiba | ..................... | H04L 1/1812 |

FOREIGN PATENT DOCUMENTS

| | | |
|---|---|---|
| CN | 103095437 A | 5/2013 |
| CN | 104079394 A | 10/2014 |
| EP | 2863686 A2 | 4/2015 |
| WO | 2011134522 A1 | 11/2011 |
| WO | 2012041101 A1 | 4/2012 |
| WO | 2014047860 A1 | 4/2014 |

OTHER PUBLICATIONS

Huawei, HiSilicon et al. HARQ-ACK Codebook determination for carrier aggregation enhancement beyond 5 carriers, 3GPP TSG RAN WG1 Meeting #82 R1-153771. Beijing, China, Aug. 24-28, 2015. total 8 pages.

* cited by examiner

| t/subframe | First indication information/second indication information | | |
|---|---|---|---|
| 1/3 | 4/3 | 3/2 | 1/1 |
| 2/3 | X | 4/2 | 2/1 |
| 3/3 | 1/3 | 1/2 | 3/1 |
| 4/3 | X | 2/2 | 4/1 |
| 1/3 | 2/3 | 3/2 | 1/1 |
| 2/3 | X | 4/2 | X |
| 3/3 | X | X | X |
| X | X | X | X |
| X | X | X | X |
| X | X | X | X |

FIG. 5A

| t/subframe | | First indication information/second indication information | | |
|---|---|---|---|---|
| f/carrier | 1/3 | 4/2 | 3/4 | 1/1 |
| | 2/3 | X | 4/4 | 2/1 |
| | 3/3 | 1/2 | 1/4 | 3/1 |
| | 4/3 | X | 2/4 | 4/1 |
| | 1/3 | 2/2 | 3/4 | 1/1 |
| | 2/3 | X | 4/4 | X |
| | 3/3 | X | X | X |
| | X | X | X | X |
| | X | X | X | X |
| | X | X | X | X |

FIG. 5B

| t/subframe | First indication information/second indication information | | |
|---|---|---|---|
| 1/1 | 4/1 | 3/1 | 1/1 |
| 2/1 | X | 4/1 | 2/1 |
| 3/1 | 1/1 | 1/1 | 3/2 |
| 4/1 | X | 2/1 | 4/3 |
| 1/1 | 2/1 | 3/1 | 1/4 |
| 2/1 | X | 4/1 | X |
| 3/1 | X | X | X |
| X | X | X | X |
| X | X | X | X |
| X | X | X | X | f/carrier

FIG. 5C

| t/subframe | First indication information/second indication information | | |
|---|---|---|---|
| 1/1 | 4/2 | 3/1 | 1/1 |
| 2/1 | X | 4/1 | 2/1 |
| 3/1 | 1/3 | 1/1 | 3/2 |
| 4/1 | X | 2/2 | 4/3 |
| 1/2 | 2/4 | 3/3 | 1/4 |
| 2/3 | X | 4/4 | X |
| 3/4 | X | X | X |
| X | X | X | X |
| X | X | X | X |
| X | X | X | X | f/carrier

FIG. 5D

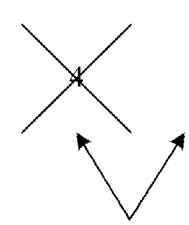

FIG. 6

| | t/subframes 4, 5, 6, and 8 → | | | | First group of carriers | | First indication information/second indication information | | |
|---|---|---|---|---|---|---|---|---|---|
| Carrier 1 #TB | 1 | 1 | 1 | 1 | Carrier 1 | 1/1 | 2/4 | 2/1 | 3/2 |
| Carrier 2 #TB | 2 | 2 | 2 | 2 | Carrier 4 | 2/1 | 3/4 | 3/1 | 4/2 |
| Carrier 3 #TB | 2 | 2 | 2 | 2 | Carrier 5 | 3/1 | 4/4 | 4/1 | X |
| Carrier 4 #TB | 1 | 1 | 1 | 1 | Carrier 7 | 4/1 | X | 1/1 | X |
| Carrier 5 #TB | 1 | 1 | 1 | 1 | Carrier 10 | 1/1 | 1/4 | 2/1 | X |
| Carrier 6 #TB | 2 | 2 | 2 | 2 | Carrier 2 | 1/3 | 4/2 | 2/1 | X |
| Carrier 7 #TB | 1 | 1 | 1 | 1 | Carrier 3 | 2/3 | 1/2 | X | X |
| Carrier 8 #TB | 2 | 2 | 2 | 2 | Carrier 6 | 3/3 | X | X | X |
| Carrier 9 #TB | 2 | 2 | 2 | 2 | Carrier 8 | X | X | X | X |
| Carrier 10 #TB | 1 | 1 | 1 | 1 | Carrier 9 | X | X | X | X |

Second group of carriers

FIG. 7A

| | t/subframes 4, 5, 6, and 8 → | | | | First group of carriers | First indication information/second indication information | | | |
|---|---|---|---|---|---|---|---|---|---|
| Carrier 1 #TB | 1 | 1 | 1 | 1 | Carrier 1 | 1/1 | 2/1 | 2/1 | 3/3 |
| Carrier 2 #TB | 2 | 2 | 2 | 2 | Carrier 4 | 2/1 | 3/2 | 3/1 | 4/4 |
| Carrier 3 #TB | 2 | 2 | 2 | 2 | Carrier 5 | 3/2 | 4/3 | 4/2 | X |
| Carrier 4 #TB | 1 | 1 | 1 | 1 | Carrier 7 | 4/3 | X | 1/3 | X |
| Carrier 5 #TB | 1 | 1 | 1 | 1 | Carrier 10 | 1/4 | 1/4 | 2/4 | X |
| Carrier 6 #TB | 2 | 2 | 2 | 2 | Carrier 2 | 1/2 | 4/3 | 2/4 | X |
| Carrier 7 #TB | 1 | 1 | 1 | 1 | Carrier 3 | 2/3 | 1/4 | X | X |
| Carrier 8 #TB | 2 | 2 | 2 | 2 | Carrier 6 | 3/4 | X | X | X |
| Carrier 9 #TB | 2 | 2 | 2 | 2 | Carrier 8 | X | X | X | X |
| Carrier 10 #TB | 1 | 1 | 1 | 1 | Carrier 9 | X | X | X | X |
| | | | | | Second group of carriers | | | | |

FIG. 7B

| | | | First group of carriers | First indication information |
|---|---|---|---|---|
| Carrier 1 #TB | 1 | | Carrier 1 | 1 |
| Carrier 2 #TB | 2 | | Carrier 3 | X |
| Carrier 3 #TB | 1 | | Carrier 5 | X |
| Carrier 4 #TB | 2 | | Carrier 7 | 3 |
| Carrier 5 #TB | 1 | | Carrier 9 | 4 |
| Carrier 6 #TB | 2 | | Carrier 11 | X |
| Carrier 7 #TB | 1 | | Carrier 2 | 1 |
| Carrier 8 #TB | 2 | | Carrier 4 | 2 |
| Carrier 9 #TB | 1 | | Carrier 6 | 3 |
| Carrier 10 #TB | 2 | | Carrier 8 | 4 |
| Carrier 11 #TB | 1 | | Carrier 10 | X |
| Carrier 12 #TB | 2 | | Carrier 12 | X |
| | | | Second group of carriers | |

UPLINK CONTROL INFORMATION TRANSMISSION METHOD AND APPARATUS

CROSS-REFERENCE TO RELATED APPLICATIONS

This application is a continuation of U.S. patent application Ser. No. 15/892,602, filed on Feb. 9, 2018, which is a continuation of International Application No. PCT/CN2015/086692, filed on Aug. 11, 2015, which claims priority to International Application No. PCT/CN2015/086538, filed on Aug. 10, 2015. All of the afore-mentioned patent applications are hereby incorporated by reference in their entireties.

TECHNICAL FIELD

The present invention relates to the field of wireless communications technologies, and in particular, to a terminal, an access network device, a wireless communications system, and an uplink control information transmission method.

BACKGROUND

In a Long Term Evolution (LTE) system, a hybrid automatic repeat request (HARQ) mechanism is used for downlink data transmission. After user equipment (UE) receives a physical downlink shared channel (PDSCH), if the physical downlink shared channel is correctly received, the UE feeds back an acknowledgment (ACK) on a physical uplink control channel (PUCCH), and if the physical downlink shared channel is incorrectly received, the UE feeds back a negative acknowledgement (NACK) on the PUCCH. The ACK and the NACK are collectively referred to as a HARQ-ACK.

The LTE system supports a carrier aggregation (CA) technology, that is, an access network device configures a plurality of carriers for one UE, to improve a data rate of the UE. As shown in FIG. 1, a base station transmits downlink data to UE 1 by using a carrier 1 and a carrier 2, and the base station transmits downlink data to UE 2 by using a carrier 1, a carrier 3, and a carrier 5.

As shown in Table 1, there are a plurality of data channel transmission modes in a current LTE system.

TABLE 1

Data channel PDSCH transmission mode in an LTE system

| | | |
|---|---|---|
| Mode 1 | Cell-specific reference signal (CRS) based on antenna ports 0 to 3 | Single-antenna port |
| Mode 2 | | Transmit diversity |
| Mode 3 | | Open-loop space division multiplex |
| Mode 4 | | Closed-loop space division multiplex |
| Mode 5 | | Multi-user multiplex |
| Mode 6 | | Single-layer closed-loop space division multiplex |
| Mode 7 | Demodulation reference signal (DMRS) based on an antenna port 5 | Single-antenna port |
| Mode 8 | DMRS based on antenna ports 7 and 8 | Double current transmission |
| Mode 9 | DMRS based on antenna ports 7 to 14 | One to eight layers of transmission |

A PDSCH scheduled in a downlink subframe in the transmission modes 1, 2, 5, 6, and 7 is a single transport block, that is, each downlink subframe corresponds to one HARQ-ACK bit, and a PDSCH scheduled in a downlink subframe in the transmission modes 3, 4, 8, and 9 may be two transport blocks, that is, each downlink subframe corresponds to two HARQ-ACK bits.

Currently, in a CA mode, to-be-aggregated carriers usually have a same PDSCH transmission mode. Therefore, bit quantities of HARQ-ACKs that need to be fed back by the UE for downlink subframes on the to-be-aggregated carriers are the same. However, as technologies develop, to-be-aggregated carriers may have different PDSCH transmission modes. For example, aggregation of a maximum of five carriers is supported currently, and aggregation of 10 carriers, 20 carriers, or even 32 carriers may appear later. In this case, to-be-aggregated carriers may have different PDSCH transmission modes, and bit quantities of HARQ-ACKs that need to be fed back for downlink subframes on different carriers are different. Currently, the UE does not support such a case in which bit quantities of HARQ-ACKs that need to be fed back for downlink subframes on different to-be-aggregated carriers are different.

SUMMARY

In view of this, embodiments of the present invention provide a terminal, an access network device, a wireless communications system, and an uplink control information transmission method, to support a case in which bit quantities of HARQ-ACKs that need to be fed back for downlink subframes on different to-be-aggregated carriers are different.

According to a first aspect, an embodiment of the present invention provides a terminal, including:

a receiving module, configured to receive downlink scheduling information of a downlink subframe $F(i, j)$, where the downlink subframe $F(i, j)$ is a subframe in a set M of preconfigured downlink subframes corresponding to an uplink subframe; where $F(i, j)$ represents a downlink subframe j on a carrier i configured for the terminal, $i \in C$, C is a set of all carriers configured for the terminal for downlink data transmission, $j \in K$, and K is a set of downlink subframes corresponding to the uplink subframe;

the set M of preconfigured downlink subframes is divided into N subsets of preconfigured downlink subframes, N is an integer greater than or equal to 2, a bit quantity of a hybrid automatic repeat request-acknowledgement HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different; and the receiving module is further configured to receive, in the downlink subframe $F(i, j)$, downlink data scheduled by the downlink scheduling information;

a processing module, configured to: generate a HARQ-ACK codebook according to a receiving status of the downlink data received by the receiving module in the downlink subframe $F(i, j)$ and a bit quantity of a HARQ-ACK that needs to be fed back for the downlink subframe $F(i, j)$, where the HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including the downlink subframe in which the terminal receives the downlink data scheduled by the downlink scheduling information; and generate uplink control information by encoding the HARQ-ACK codebook; and a sending module, configured to send the uplink control information in the uplink subframe.

According to a second aspect, an embodiment of the present invention provides an access network device, including:

a sending module, configured to: send downlink scheduling information of a downlink subframe F(i, j) to a terminal, and send, to the terminal in the downlink subframe F(i, j), downlink data scheduled by the downlink scheduling information, where the downlink subframe F(i, j) is a subframe in a set M of preconfigured downlink subframes corresponding to an uplink subframe; where F(i, j) represents a downlink subframe j on a carrier i configured for the terminal, i∈C, C is a set of all carriers configured for the terminal for downlink data transmission, j∈K, and K is a set of downlink subframes corresponding to the uplink subframe; and the set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of hybrid automatic repeat request-acknowledgements HARQ-ACKs that need to be fed back for any downlink subframes in different subsets of preconfigured downlink subframes are different;

a receiving module, configured to receive uplink control information that is sent by the terminal in the uplink subframe and that is used for feeding back a receiving status of the downlink data scheduled by the downlink scheduling information; and a processing module, configured to obtain a HARQ-ACK codebook by decoding the uplink control information, where the obtained HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink data scheduled by the downlink scheduling information is sent.

According to a third aspect, an embodiment of the present invention provides an uplink control information sending method, including:

receiving, by a terminal, downlink scheduling information of a downlink subframe F(i, j), where the downlink subframe F(i, j) is a subframe in a set M of preconfigured downlink subframes corresponding to an uplink subframe; where F(i, j) represents a downlink subframe j on a carrier i configured for the terminal, i∈C, C is a set of all carriers configured for the terminal for downlink data transmission, j∈K, and K is a set of downlink subframes corresponding to the uplink subframe; and the set M of preconfigured downlink subframes is divided into N subsets of preconfigured downlink subframes, N is an integer greater than or equal to 2, a bit quantity of a hybrid automatic repeat request-acknowledgement HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different;

receiving, by the terminal in the downlink subframe F(i, j), downlink data scheduled by the downlink scheduling information;

generating, by the terminal, a HARQ-ACK codebook according to a receiving status of the downlink data received in the downlink subframe F(i, j) and a bit quantity of a HARQ-ACK that needs to be fed back for the downlink subframe F(i, j), where the HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including the downlink subframe in which the terminal receives the downlink data scheduled by the downlink scheduling information;

generating uplink control information by encoding the HARQ-ACK codebook; and sending, by the terminal, the uplink control information in the uplink subframe.

According to a fourth aspect, an embodiment of the present invention provides an uplink control information receiving method, including:

sending, by an access network device, downlink scheduling information of a downlink subframe F(i, j) to a terminal, and sending, to the terminal in the downlink subframe F(i, j), downlink data scheduled by the downlink scheduling information, where the downlink subframe F(i, j) is a subframe in a set M of preconfigured downlink subframes corresponding to an uplink subframe; where F(i, j) represents a downlink subframe j on a carrier i configured for the terminal, i∈C, C is a set of all carriers configured for the terminal for downlink data transmission, j∈K, and K is a set of downlink subframes corresponding to the uplink subframe; and the set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of hybrid automatic repeat request-acknowledgements HARQ-ACKs that need to be fed back for any downlink subframes in different subsets of preconfigured downlink subframes are different;

receiving uplink control information that is sent by the terminal in the uplink subframe and that is used for feeding back a receiving status of the downlink data scheduled by the downlink scheduling information; and obtaining a HARQ-ACK codebook by decoding the received uplink control information, where the obtained HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink data scheduled by the downlink scheduling information is sent.

According to a fifth aspect, an embodiment of the present invention provides a wireless communications system, including: an access network device and a terminal; where
- the access network device is configured to: send downlink scheduling information of a downlink subframe F(i, j) to the terminal, and send, to the terminal in the downlink subframe F(i, j), downlink data scheduled by the downlink scheduling information, where the downlink subframe F(i, j) is a subframe in a set M of preconfigured downlink subframes corresponding to an uplink subframe; where
- F(i, j) represents a downlink subframe j on a carrier i configured for the terminal, i∈C, C is a set of all carriers configured for the terminal for downlink data transmission, j∈K, and K is a set of downlink subframes corresponding to the uplink subframe; and
- the set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of hybrid automatic repeat request-acknowledgements HARQ-ACKs that need to be fed back for any downlink subframes in different subsets of preconfigured downlink subframes are different;
- the terminal is configured to: receive the downlink scheduling information of the downlink subframe F(i, j); receive, in the downlink subframe F(i, j), the downlink data scheduled by the downlink scheduling information; generate a HARQ-ACK codebook according to a receiving status of the downlink data received in the downlink subframe F(i, j) and a bit quantity of a HARQ-ACK that needs to be fed back for the downlink subframe F(i, j); generate uplink control information by encoding the HARQ-ACK codebook; and send the generated uplink control information in the uplink subframe; where
- the HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink data scheduled by the downlink scheduling information is sent; and
- the access network device is further configured to: receive uplink control information that is sent by the terminal in the uplink subframe and that is used for feeding back the receiving status of the downlink data scheduled by the downlink scheduling information, and obtain the HARQ-ACK codebook by decoding the received uplink control information.

In the embodiments of the present invention, the set M of preconfigured downlink subframes is divided into the foregoing N subset of preconfigured downlink subframes, the bit quantity of the HARQ-ACK that needs to be fed back for each downlink subframe in one subset of preconfigured downlink subframes is a predetermined value, and the bit quantities of the HARQ-ACKs that need to be fed back for any downlink subframes in different subsets of preconfigured downlink subframes are different. In this way, when generating an ACK/NACK codebook, the terminal feeds back a HARQ-ACK according to the bit quantity of the HARQ-ACK that needs to be fed back for the downlink subframe in the subset of preconfigured downlink subframes. Therefore, when the access network device parses, after receiving the uplink control information generated according to the HARQ-ACK codebook, the ACK/NACK codebook according to the bit quantity of the HARQ-ACK that needs to be fed back for the downlink subframe in the subset of preconfigured downlink subframes, a HARQ-ACK feedback solution is provided, so that a case in which bit quantities of HARQ-ACKs that need to be fed back for downlink subframes on different to-be-aggregated carriers are different can be supported.

BRIEF DESCRIPTION OF DRAWINGS

FIG. 5A to FIG. 5D are schematic diagrams of first indication information and second indication information in Embodiment 2 of the present invention;

FIG. 6 is a schematic diagram of a case in which a terminal cannot determine how to fill in a NACK in Embodiment 2 of the present invention;

FIG. 7A to FIG. 7B are schematic diagrams of first indication information and second indication information in Embodiment 3 of the present invention;

DESCRIPTION OF EMBODIMENTS

Figure 1:
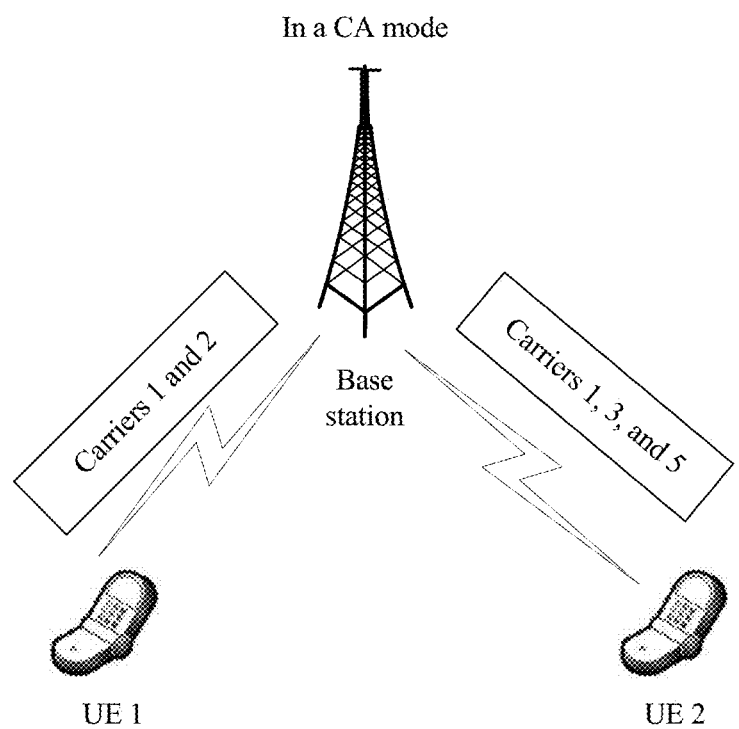
FIG. 1 is a schematic diagram of a data transmission manner between UE and an access network device in a current CA mode.

Embodiments of the present invention provide a terminal, an access network device, a wireless communications system, and an uplink control information transmission method, to support a case in which bit quantities of HARQ-ACKs that need to be fed back for downlink subframes on different to-be-aggregated carriers are different.

In the embodiments of the present invention, the access network device sends downlink scheduling information of a downlink subframe F(i, j) to the terminal, and sends downlink data scheduled by the downlink scheduling information. The downlink subframe F(i, j) is a subframe in a set M of preconfigured downlink subframes corresponding to an uplink subframe.

F(i, j) represents a downlink subframe j on a carrier i configured for the terminal, i∈C, C is a set of all carriers configured for the terminal for downlink data transmission, j∈K, and K is a set of downlink subframes corresponding to the uplink subframe.

The set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different.

The terminal receives the downlink scheduling information of the downlink subframe F(i, j), and receives, in the downlink subframe F(i, j), the downlink data scheduled by the downlink scheduling information. The terminal generates a HARQ-ACK codebook according to a receiving status of the downlink data received in the downlink subframe F(i, j) and a bit quantity of a HARQ-ACK that needs to be fed back for the downlink subframe F(i, j).

The generated HARQ-ACK codebook includes at least one sub-codebook, the included at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink scheduling information is sent by the access network device.

The terminal generates uplink control information by encoding the HARQ-ACK codebook, and sends the generated uplink control information in the uplink subframe.

The access network device receives the uplink control information sent by the terminal, and obtains the HARQ-ACK codebook by decoding the received uplink control information.

The set M of preconfigured downlink subframes is divided into the foregoing N subset of preconfigured downlink subframes, the bit quantity of the HARQ-ACK that needs to be fed back for each downlink subframe in one subset of preconfigured downlink subframes is a predetermined value, and the bit quantities of the HARQ-ACKs that need to be fed back for any downlink subframes in different subsets of preconfigured downlink subframes are different. In this way, when generating an ACK/NACK codebook, the terminal feeds back a HARQ-ACK according to the bit quantity of the HARQ-ACK that needs to be fed back for the downlink subframe in the subset of preconfigured downlink subframes. Therefore, when the access network device parses, after receiving the uplink control information generated according to the HARQ-ACK codebook, the ACK/NACK codebook according to the bit quantity of the HARQ-ACK that needs to be fed back for the downlink subframe in the subset of preconfigured downlink subframes, a HARQ-ACK feedback solution is provided, so that a case in which bit quantities of HARQ-ACKs that need to be fed back for downlink subframes on different to-be-aggregated carriers are different can be supported.

For ease of understanding of the embodiments of the present invention, basic concepts used in the embodiments of the present invention are described below.

For ease of understanding, an LTE system is used as an example for description, but this does not mean that the embodiments of the present invention are only applicable to the LTE system. Actually, a HARQ-ACK feedback solution provided in the embodiments of the present invention can be used for any wireless communications system in which a plurality of carriers are provided for a same terminal for data transmission and bit quantities of feedback information corresponding to downlink subframes on different carriers are different.

1. Data Transmission in the LTE System

In the LTE system, downlink transmission, that is, transmission from an access network device such as a base station to UE, is based on an orthogonal frequency division multiple access (OFDMA) manner, and uplink transmission, that is, transmission from the UE to the access network device, is based on a single carrier frequency division multiple access (SC-FDMA) manner.

For the downlink transmission, time-frequency resources are divided into OFDM symbols in a time-domain dimension and subcarriers in a frequency-domain dimension, and for the uplink transmission, time-frequency resources are divided into SC-FDMA symbols in a frequency-domain dimension. In the embodiments of the present invention, the OFDM symbol and the SC-FDMA symbol are collectively referred to as a "time-domain symbol".

In the LTE system, a minimum resource granularity is referred to as a resource element (RE) that represents a time-frequency lattice point including a time-domain symbol in a time domain and a subcarrier in a frequency domain.

Generally, a basic time unit used by the access network device for scheduling is a subframe, and one subframe includes a plurality of time-domain symbols. Alternatively, for some scenarios in which a transmission delay needs to be reduced, a basic time unit used by the access network device for scheduling may be one or more time-domain symbols.

A specific scheduling process is: The access network device sends a control channel such as a physical downlink control channel (PDCCH) or an enhanced physical downlink control channel (EPDCCH), where the control channel may carry scheduling information of a PDSCH or a PUSCH, and the scheduling information includes control information such as resource allocation information or a modulation and coding manner; and the UE receives the control channel in a subframe, and receives a downlink data channel or sends an uplink data channel according to the scheduling information carried in the received control channel The LTE system supports a frequency division duplex (FDD) manner and a time division duplex (TDD) manner.

For an LTE system using the FDD manner, which is briefly referred to as an FDD LTE system, different carriers are used for downlink transmission and uplink transmission. For an LTE system using the TDD manner, which is briefly referred to as a TDD LTE system, different times of a same carrier are used for uplink transmission and downlink transmission, and a carrier specifically includes a downlink subframe, an uplink subframe, and a special subframe.

The special subframe includes three parts: a downlink pilot timeslot (DwPTS), a guard period (GP), and an uplink pilot timeslot (UpPTS). The GP is mainly used as a downlink-to-uplink component conversion time and compensation for a downlink-to-uplink propagation delay. In addition, downlink data can be transmitted in the DwPTS, and a PUSCH cannot be transmitted in the UpPTS. Therefore, from this perspective, the special subframe may be considered as a downlink subframe.

2. HARQ-ACK Time Sequence Relationship

In the FDD LTE system, after receiving a PDSCH in a subframe n−4, the UE feeds back a HARQ-ACK in a subframe n. In the TDD LTE system, a time sequence relationship between PDSCH receiving and HARQ-ACK feedback corresponding to the PDSCH receiving is shown in Table 2. A subframe marked with a number is an uplink subframe n used for feeding back a HARQ-ACK, and the marked number indicates that a HARQ-ACK corresponding to a PDSCH in a set of downlink subframes n−k (k belongs to K) needs to be fed back in the uplink subframe n. For example, K={7, 6} in a subframe n=2 in an uplink-downlink configuration 1 indicates that the uplink subframe n=2 is used for feeding back HARQ-ACKs corresponding to PDSCHs in two downlink subframes n−7 and n−6, and specifically, n−7 is a downlink subframe 5 and n−6 is a downlink subframe 6.

TABLE 2

Time sequence relationship between a PDSCH and
a corresponding HARQ-ACK in a TDD LTE system

| Uplink-downlink configu-ration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

3. TDD Uplink-Downlink Configuration in the LTE System

The LTE system currently supports seven types of different TDD uplink-downlink configurations, and the uplink-downlink configurations are the first column of Table 2. As shown in Table 3, D represents a downlink subframe, S represents a special subframe, and U represents an uplink subframe.

TABLE 3

Different TDD uplink-downlink configurations in the LTE system

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

4. Carrier Aggregation Supported by the LTE System

The LTE system supports FDD CA, TDD CA, and FDD+TDD CA. TDD CA is further classified into TDD CA with a same uplink-downlink configuration and TDD CA with different uplink-downlink configurations. There is one primary component carrier and at least one secondary component carrier in a CA mode, and a PUCCH carrying a HARQ-ACK can be sent only on an uplink primary component carrier configured on the UE. A current PUCCH format supports transmission of a HARQ-ACK of a maximum of 22 bits.

5. Set M of Preconfigured Downlink Subframes

The set M of preconfigured downlink subframes is corresponding to an uplink subframe on a primary component carrier in CA.

A downlink subframe F(i, j)∈M, j∈C, C is a set of all carriers configured for a terminal for downlink data transmission, j∈K, K is a set of downlink subframes corresponding to an uplink subframe according to the HARQ-ACK time sequence relationship, and the time sequence relationship may be the time sequence relationship that is shown in Table 2 and that is between a PDSCH and a corresponding HARQ-ACK in the TDD LTE system.

The current LTE system supports a case of configuring a maximum of five carriers for one UE for carrier aggregation. A most typical TDD uplink-downlink configuration 2 is used as an example. A set M of preconfigured downlink subframes corresponding to or associated with an uplink subframe 2 on an uplink primary component carrier includes subframes 4, 5, 6, and 8 on the five carriers, that is, 20 downlink subframes in total.

For simple description, the special subframe is considered as a downlink subframe. A meaning of the "corresponding to or associated with" mentioned herein may be understood as: All HARQ-ACKs corresponding to PDSCHs in the foregoing 20 downlink subframes are fed back in the uplink subframe 2, and this may be specifically determined according to the time sequence relationship that is in Table 2 and that is between a PDSCH and a HARQ-ACK.

6. HARQ-ACK Codebook and HARQ-ACK Information

On a UE side, the HARQ-ACK codebook represents original HARQ-ACK bit streams that exist before channel encoding, and the original bit streams may be sorted according to a specific sorting rule. These original HARQ-ACK information bits may be bit streams of 1 or 0. "1" is an ACK indicating that downlink data is correctly received, and "0" is a NACK indicating that downlink data is not correctly received. The UE sends, to the access network device, HARQ-ACK information generated after the UE performs channel encoding on the HARQ-ACK codebook. On an access network device side, the access network device receives the HARQ-ACK information sent by the UE, and obtains the HARQ-ACK codebook after performing channel decoding on the HARQ-ACK information.

The configuring five carriers for one UE for carrier aggregation and the TDD uplink-downlink configuration 2 in the item 5 "set M of preconfigured downlink subframes" are still used as an example. The HARQ-ACK codebook generated by the UE may be determined according to the set M of preconfigured downlink subframes. Specifically, carriers may be sorted before subframes are sorted, that is, the foregoing sorting rule may be carriers before subframes. For example, HARQ-ACK bits corresponding to subframes 4, 5, 6, and 8 on a carrier 1 are arranged before HARQ-ACK bits corresponding to subframes 4, 5, 6, and 8 on a carrier 2. In addition, for a location at which the UE fails to receive a subframe scheduled by the PDSCH, the UE needs to fill in a NACK.

7. Scenario in Which the UE Needs to Feed Back, in One Uplink Subframe, a HARQ-ACK of a Relatively Large Bit Quantity With further evolution of LTE technologies, feedback of a HARQ-ACK of an even larger bit quantity may need to be supported in the future, and the bit quantity may be far greater than 22.

Scenario 1

CA of an even larger quantity of carriers is introduced, and is referred to as "super CA" for short.

For example, CA of ten carriers or even a maximum of 32 carriers is "super CA". CA of ten carriers with the TDD uplink-downlink configuration 2 is used as an example. In this case, a HARQ-ACK of 40 bits needs to be fed back in an uplink subframe 2 on an uplink primary component carrier.

Scenario 2

CA of five carriers is supported, but a plurality of carriers are configured as a TDD uplink-downlink configuration 5. For example, a primary component carrier is the uplink-downlink configuration 2, and four secondary component carriers are the uplink-downlink configuration 5. In this case, a HARQ-ACK of 4+9×4=40 bits needs to be fed back in an uplink subframe 2 on an uplink primary component carrier.

A possible solution is: introducing a PUCCH format that supports transmission with an even larger bit capacity. In consideration of a case in which this new PUCCH format needs to support an even larger quantity of HARQ-ACK bits, for example, 128 HARQ-ACK bits may be supported in configuration of the TDD uplink-downlink configuration 2 of 32 carriers, introduction of the new format increases uplink control channel overheads.

An optional solution in the embodiments of the present invention may be applied to the foregoing scenario in which the UE needs to feed back, in one uplink subframe, a HARQ-ACK of a relatively large bit quantity, so that a bit quantity of a HARQ-ACK that needs to be fed back by the UE can be effectively reduced.

8. A Communications Standard, a Terminal, and an Access Network Device to Which the Embodiments of the Present Invention are Applicable Communications standards of various wireless communications systems provided in the embodiments of the present invention include but are not limited to Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution-Advanced (LTE-advanced), a personal handyphone system (PHS), Wireless Fidelity (WiFi) stipulated in the 802.11 series of protocols, Worldwide Interoperability for Microwave Access (WiMAX), and various evolved wireless communications systems in the future.

The embodiments of the present invention can be used for any wireless communications system in which bit quantities of feedback information corresponding to different carriers are different because a plurality of carriers are provided for a same terminal for data transmission and the different carriers have different transmission modes. Therefore, the terminal correctly sends the HARQ-ACK information, and the access network device can accurately learn a downlink data receiving status of the terminal according to the received HARQ-ACK information.

The terminal in the embodiments of the present invention may be a wireless terminal. The wireless terminal may be a device that provides a voice and/or data connectivity for a user, a handheld device with a wireless connection function, or another processing device connected to a wireless modem. The wireless terminal may communicate with one or more core networks by using a radio access network (for example, RAN). The wireless terminal may be a mobile terminal such as a mobile phone (or referred to as a "cellular" phone) or a computer with a mobile terminal. For example, the wireless terminal may be a portable, pocket-sized, handheld, computer built-in, or in-vehicle mobile apparatus that exchanges a voice and/or data with the radio access network. For example, the wireless terminal is a device such as a personal communication service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

The access network device provided in the embodiments of the present invention may include a base station, a wireless resource management device configured to control a base station, or a base station and a wireless resource management device configured to control the base station. The access network device may be a macro station or a small station, and the terminal is a terminal device that communicates with the access network device.

For example, for an LTE system such as TDD LTE, FDD LTE, or LTE-A, the access network device in the wireless communications system provided in the embodiments of the present invention may be an evolved NodeB (eNodeB), and the terminal may be UE. For a TD-SCDMA system or a WCDMA system, the access network device in the wireless communications system provided in the embodiments of the present invention may include a NodeB and/or a radio network controller (RNC), and the terminal may be UE. For a GSM system, the access network device provided in the embodiments of the present invention may include a base transceiver station (BTS) and/or a base station controller (BSC), and the terminal is a mobile station (MS). For a WiFi system, the access network device may include an access point (AP) and/or an access controller (AC), and the terminal may be a station (STA).

9. Other Descriptions

In addition, the terms "system" and "network" may be usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

Basic concepts in the embodiments of the present invention are described above. For ease of understanding, the embodiments of the present invention are described in detail below with reference to the accompanying drawings. For clarity of description, the embodiments of the present invention are listed in Table 4.

TABLE 4

List of embodiments of the present invention

| Embodiment | Brief description |
| --- | --- |
| Embodiment 1 | First wireless communications system (A set M of preconfigured downlink subframes is divided into N subsets of preconfigured downlink subframes.) |
| Embodiment 2 | Second wireless communications system (A HARQ-ACK is fed back for a scheduled downlink subframe; whether downlink scheduling information is undetected is determined; and if the downlink scheduling information is undetected, a NACK is filled in for a HARQ-ACK at an undetected location.) |
| Embodiment 3 | Third wireless communications system (A set M of preconfigured downlink subframes is divided into N subsets of preconfigured downlink subframes; a HARQ-ACK is fed back for a scheduled downlink subframe; whether downlink scheduling information is undetected is determined; and if the downlink scheduling information is undetected, a NACK is filled in for a HARQ-ACK at an undetected location.) |
| Embodiment 4 | Access network device |
| Embodiment 5 | Terminal |
| Embodiment 6 | Uplink control information sending method |
| Embodiment 7 | Uplink control information receiving method |

The embodiments of the present invention are described in detail below.

EMBODIMENT 1

Figure 2A:
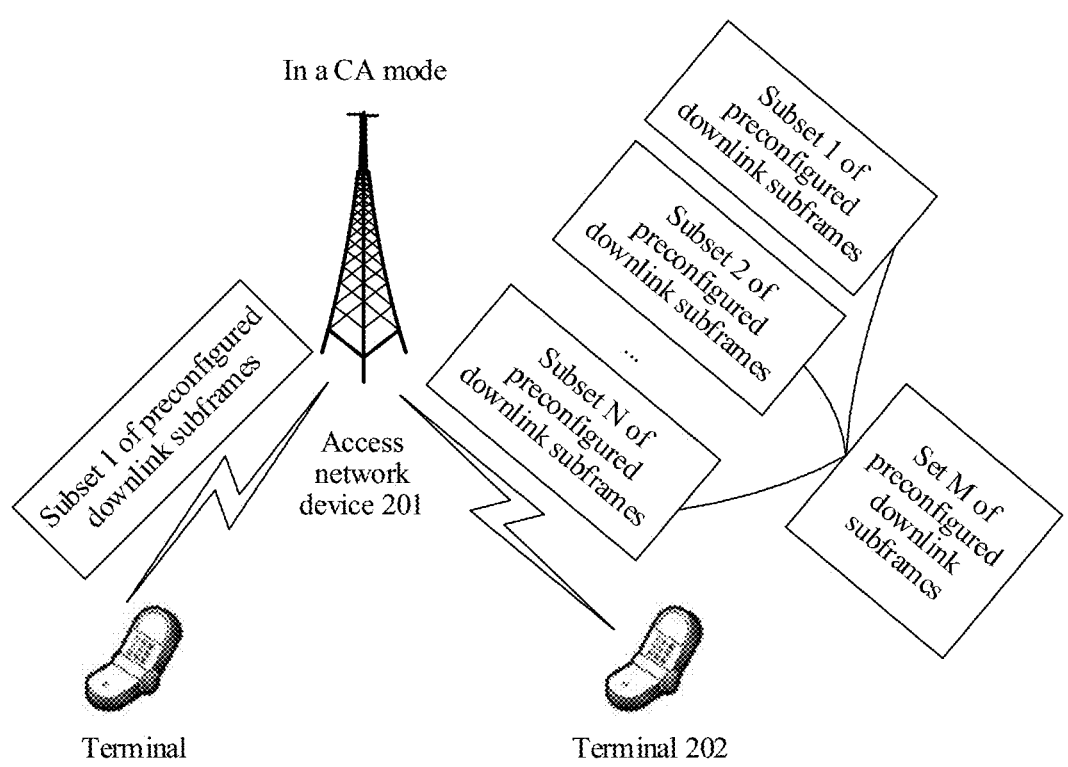
FIG. 2A is a schematic structural diagram of a first wireless communications system according to Embodiment 1 of the present invention and a third wireless communications system according to Embodiment 3 of the present invention.

As shown in FIG. 2A, a first wireless communications system provided in Embodiment 1 of the present invention includes an access network device 201 and a terminal 202.

The access network device 201 is configured to: send downlink scheduling information of a downlink subframe $F(i, j)$ to the terminal 202, and send, in the downlink subframe $F(i, j)$, downlink data scheduled by the downlink scheduling information. The downlink subframe $F(i, j)$ is a subframe in a set M of preconfigured downlink subframes corresponding to an uplink subframe, for example, a subframe in a preconfigured downlink subframe M corresponding to one uplink subframe.

$F(i, j)$ represents a downlink subframe j on a carrier i configured for the terminal, $i \in C$, C is a set of all carriers configured for the terminal for downlink data transmission, $j \in K$, and K is a set of downlink subframes corresponding to the uplink subframe.

The set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different.

The terminal 202 is configured to: receive the downlink scheduling information of the downlink subframe $F(i, j)$; receive, in the downlink subframe $F(i, j)$, the downlink data scheduled by the downlink scheduling information; generate a HARQ-ACK codebook according to a receiving status of the downlink data received in the downlink subframe $F(i, j)$ and a bit quantity of a HARQ-ACK that needs to be fed back for the downlink subframe $F(i, j)$; generate uplink control information by encoding the generated HARQ-ACK codebook; and send the generated uplink control information in the uplink subframe.

The HARQ-ACK codebook generated by the terminal 202 includes at least one sub-codebook, the included at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink scheduling information is sent by the access network device 201.

The access network device 201 is further configured to: receive the uplink control information sent by the terminal 202, and obtain the HARQ-ACK codebook after decoding the received uplink control information.

A process of downlink scheduling, downlink data transmission, and HARQ-ACK information feedback between the access network device 201 and the terminal 202 is described below with reference to FIG. 3. The process includes the following steps:

S301. The access network device 201 sends downlink scheduling information of a downlink subframe $F(i, j)$ to the terminal 202.

S302. The terminal 202 receives the downlink scheduling information.

S303. The access network device 201 sends, in the downlink subframe $F(i, j)$, downlink data scheduled by the downlink scheduling information sent in step S301.

S304. The terminal 202 receives, in the downlink subframe $F(i, j)$ according to the downlink scheduling information received in step S302, the downlink data scheduled by the downlink scheduling information.

S305. The terminal 202 generates a HARQ-ACK codebook according to a receiving status of the downlink data received in the downlink subframe $F(i, j)$ and a bit quantity of a HARQ-ACK that needs to be fed back for the downlink subframe $F(i, j)$, and generates uplink control information by encoding the generated HARQ-ACK codebook.

S306. The terminal 202 sends the generated uplink control information to the access network device 201.

S307. The access network device 201 obtains the HARQ-ACK codebook after decoding the received uplink control information, and determines, according to the obtained HARQ-ACK codebook, the receiving status of the downlink data in the downlink subframe $F(i, j)$ that is scheduled in a set M of preconfigured downlink subframes.

Step S301 and step S303 may be completed in a same step. For example, for an LTE system, the access network device 201 sends, in a same downlink subframe used for sending the downlink scheduling information, the downlink data scheduled by the downlink scheduling information. In this case, step S302 and step S304 may also be completed in a same step. The terminal 202 may receive downlink data in a downlink subframe according to received downlink scheduling information in the same downlink subframe.

Figure 3:
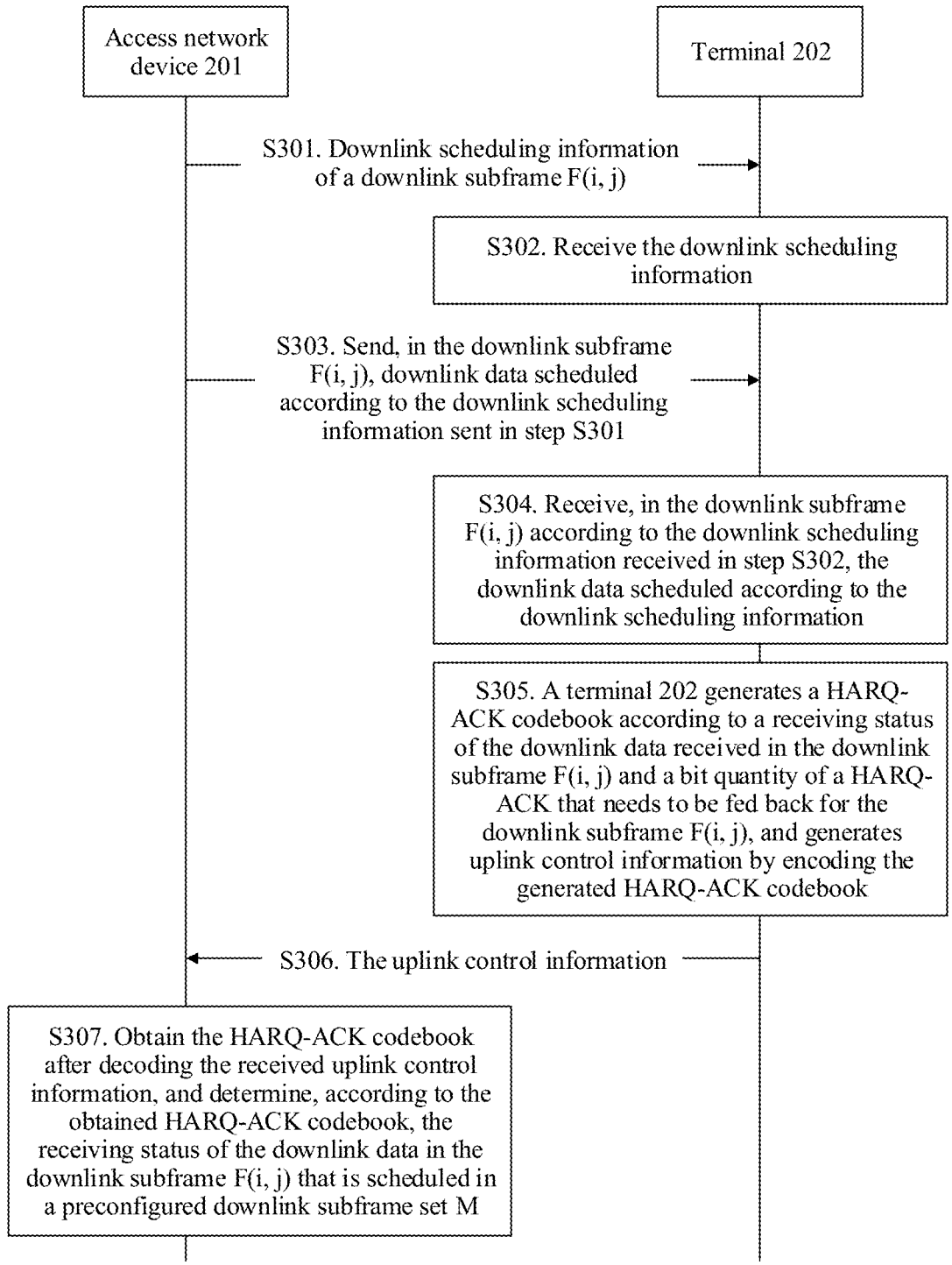
FIG. 3 is a flowchart of data transmission between an access network device and a terminal in a first wireless communications system according to Embodiment 1 of the present invention.

In addition, to send downlink scheduling information in a downlink subframe m and schedule the terminal to receive downlink data that is in a downlink subframe m+1, the access network device 201 may use a manner shown in FIG. 3: sending the scheduling information before sending the downlink data. Accordingly, the terminal 202 receives the downlink scheduling information first, and then receives the downlink data according to the received downlink scheduling information. Alternatively, a case in which downlink scheduling information is sent in a downlink subframe m on a carrier 1 and the terminal is scheduled to receive downlink data that is in a downlink subframe m on a carrier 2 is equivalent to that the downlink scheduling information and the downlink data scheduled by the downlink scheduling information are sent and received in a downlink subframe at a same moment, but the downlink scheduling information and the downlink data scheduled by the downlink scheduling information are on different carriers.

A process and an implementation scheme shown in FIG. 3 are described in detail below.

1. Step S301. The access network device 201 sends the downlink scheduling information.

In this embodiment of the present invention, in step S301, the access network device 201 sends the downlink scheduling information of the downlink subframe F(i, j). The downlink subframe F(i, j) is a subframe in a set M of preconfigured downlink subframes corresponding to an uplink subframe, F(i, j) represents a downlink subframe j on a carrier i configured for the terminal 202, i∈C, C is a set of all carriers configured for the terminal 202 for downlink data transmission, j∈K, and K is a set of downlink subframes corresponding to the uplink subframe.

The set M of preconfigured downlink subframes may be all downlink subframes on all aggregated carriers corresponding to one uplink subframe according to a HARQ-ACK time sequence relationship, for example, a time sequence relationship that is defined in Table 2 and that is between a PDSCH and a corresponding HARQ-ACK. That is, the terminal 202 feeds back, in the uplink subframe according to the defined HARQ-ACK time sequence relationship, a HARQ-ACK for receiving of downlink data in each downlink subframe in the set M of preconfigured downlink subframes.

In a CA mode, the access network device 201 configures a plurality of carriers for the terminal 202. For example, a plurality of carriers are configured by using radio resource control (Radio Resource Control, RRC) signaling, the plurality of carriers may be FDD carriers or TDD carriers, and each carrier includes a plurality of downlink subframes. For the TDD carrier, different carriers may have a same uplink-downlink configuration or different uplink-downlink configurations.

For example, ten TDD carriers with a same uplink-downlink configuration 2 are configured for the terminal 202. According to the TDD uplink-downlink subframe configurations in Table 2 and the time sequence relationship that is in Table 1 and that is between downlink data and an uplink HARQ-ACK, HARQ-ACKs corresponding to downlink data channels in downlink subframes 4, 5, 6, and 8 on a maximum of the foregoing ten carriers need to be fed back in an uplink subframe 2 on a primary component carrier.

These downlink subframes, that is, the downlink data channels in these downlink subframes may be separately scheduled by using independent downlink control channels, or may be scheduled by using a unified downlink control channel, or may be scheduled by using a combination thereof. For example, a downlink data channel in at least one downlink subframe is scheduled by each of a plurality of downlink control channels. In this embodiment of the present invention, scheduling by using independent downlink control channels is used as an example for description.

The downlink subframe mentioned herein includes a common downlink subframe and also includes a special subframe in a TDD system. After a plurality of carriers are configured for the terminal 202, the access network device 201 may send a downlink control channel, to schedule downlink data channels in downlink subframes on these configured carriers. Further, the terminal 202 needs to feed back uplink HARQ-ACKs corresponding to these downlink data channels.

For example, the terminal 202 feeds back a HARQ-ACK in an uplink subframe 2. According to a time sequence relationship that is in a TDD configuration 2 and that is between a downlink data channel and an uplink HARQ-ACK, a set M of preconfigured downlink subframes associated with the uplink subframe 2 includes: 40 downlink subframes, that is, a subframe 4, a subframe 5, a subframe 6, and a subframe 8 on carriers 1 to 10. That is, a HARQ-ACK that needs to be fed back by the terminal 202 in an uplink subframe 2 on a primary component carrier in carrier aggregation is corresponding to a downlink data channel in the set M of preconfigured downlink subframes.

The terminal 202 may receive the downlink control channel in the set M of preconfigured downlink subframes, for example, the terminal 202 may receive downlink control channels in all downlink subframes in the set of preconfigured downlink subframes, or may receive downlink control channels in some subframes in the set of preconfigured downlink subframes. Then, the terminal 202 further receives, according to the received downlink control channels, downlink data channels scheduled by these downlink control channels.

The downlink control channel and the downlink data channel scheduled by the downlink control channel are usually in a same subframe. Alternatively, as described above, the downlink control channel and the downlink data channel scheduled by the downlink control channel may be in different subframes provided that a correspondence between the downlink control channel and the downlink data channel scheduled by the downlink control channel can be identified. For example, a time sequence relationship between the two channels is pre-specified, the access network device 201 sends the downlink control channel and the downlink data channel according to the pre-specified time sequence relationship, and the terminal 202 receives the downlink control channel and the downlink data channel according to the pre-specified time sequence relationship.

Herein, a downlink subframe subset that is of the set M of preconfigured downlink subframes of the terminal 202 and in which an actually scheduled downlink data channel is located is referred to as an "instantly scheduled downlink subframe set", and the instantly scheduled downlink subframe set is a subset of the set M of preconfigured downlink subframes.

The downlink data channel in the scheduled downlink subframe may include a first downlink data channel scheduled by a downlink control channel, that is, a dynamically scheduled downlink data channel, or may include a second downlink data channel that is not scheduled by a downlink control channel, for example, a downlink data channel used for semi-persistent scheduling (SPS). Usually, after an SPS mechanism of a terminal is activated, a downlink data channel used for SPS does not require downlink control and scheduling during initial transmission of a HARQ, but the downlink data channel used for the SPS is directly sent at a preconfigured period such as 20 ms.

In addition, the access network device 201 may further send a separate special downlink control channel. In an LTE system, the downlink control information may be a PDCCH, and the special downlink control channel does not schedule a downlink data channel but is used for instructing to terminate or release the SPS mechanism. However, a corresponding uplink HARQ-ACK also needs to be fed back for the special downlink control channel. Therefore, optionally, a subframe that is in the set of preconfigured downlink subframes and that is used for transmitting the special downlink control channel may also be placed in the instantly scheduled downlink subframe set, and the terminal 202 may also feed back a corresponding HARQ-ACK for the subframe.

2. Step S302. The terminal 202 receives the downlink scheduling information.

In step S302, the terminal 202 receives the downlink scheduling information sent by the access network device 201. As described above, the downlink scheduling information may include control information such as resource allocation information or a modulation and coding manner. The terminal 202 learns, according to the received downlink scheduling information, information such as information about a resource allocated for downlink data transmission and a modulation and coding manner of downlink data, and the terminal 202 receives the downlink data according to the learned information.

However, due to a time-varying characteristic of a radio channel, the terminal 202 may fail to receive downlink scheduling information when the radio channel is of poor quality. In this case, the terminal 202 cannot obtain the downlink scheduling information, and cannot receive the downlink data according to the downlink scheduling information.

Optionally, if the access network device 201 sends the foregoing special downlink control channel to the terminal 202, and as described above, the special downlink control channel is used for instructing to terminate or release the SPS mechanism, the terminal 202 further needs to receive the special downlink control channel.

3. Step S303. The access network device 201 sends the downlink data in the downlink subframe F(i, j).

After sending the downlink scheduling information, the access network device 201 sends the downlink data in the downlink subframe F(i, j) according to the control information such as the resource allocation information or the modulation and coding manner in the downlink scheduling information.

4. Step S304. The terminal 202 receives the downlink data.

The terminal 202 receives the downlink data in the downlink subframe F(i, j) according to the downlink scheduling information received in step S302. If the terminal 202 fails to receive the downlink scheduling information of the downlink subframe F(i, j) in step S302, the terminal 202 does not receive the downlink data in the downlink subframe F(i, j) in step S304.

5. Division of the Set M of Preconfigured Downlink Subframes

The set M of preconfigured downlink subframes may be divided into N subsets of preconfigured downlink subframes, N is an integer greater than or equal to 2, and a bit quantity of a HARQ-ACK that needs to be fed back by the terminal 202 for each downlink subframe in the subset of preconfigured downlink subframes is a predetermined value.

Both the terminal 202 and the access network device 201 need to know a division rule of the set M of preconfigured downlink subframes in advance, and the rule is the same for the terminal 202 and the access network device 201. The terminal 202 generates an ACK/NACK codebook according to the same division rule, and the access network device 201 parses the ACK/NACK codebook according to the same rule, so as to accurately learn a downlink data receiving status of the terminal 202. Alternatively, the access network device 201 determines the foregoing rule and then notifies the terminal of the rule, that is, the access network device and the terminal have consistent understanding of the foregoing rule.

For example, both the terminal 202 and the access network device 201 need to know a value of N and a subset of preconfigured downlink subframes to which a downlink subframe in the set M of preconfigured downlink subframes belongs, and know a bit quantity of a HARQ-ACK that needs to be fed back for a downlink subframe in each subset of preconfigured downlink subframes. For example, both the access network device 201 and the terminal 202 may determine, according to a data channel transmission mode of a downlink subframe, a bit quantity of a HARQ-ACK that needs to be fed back for the downlink subframe, and determine a subset of preconfigured downlink subframes to which the downlink subframe belongs. In this way, the terminal 202 correctly fills in a HARQ-ACK bit and generates a HARQ-ACK codebook according to the determined bit quantity of the HARQ-ACK and the determined subset of preconfigured downlink subframes to which the downlink subframe belongs. The access network device 201 parses the HARQ-ACK codebook according to a same rule, so that the access network device 201 can accurately learn the receiving status of the downlink data.

That the terminal 202 feeds back a HARQ-ACK in an uplink subframe is still used as an example. Data channel transmission modes on all the ten carriers configured for the terminal 202 may be the same or different. It is assumed that two different data channel transmission modes are configured, each PDSCH in a first data channel transmission mode is configured to correspond to one transport block, that is, correspond to one HARQ-ACK bit, and each PDSCH in a second data channel transmission mode is configured to correspond to two transport blocks, that is, correspond to two HARQ-ACK bits.

It should be noted that, for a carrier, the access network device 201 may perform configuration, so that the terminal uses a transmission mode with two transport blocks, that is, two transport blocks may be transmitted in each downlink subframe on the carrier, and therefore each downlink subframe corresponds to two HARQ-ACK bits. In this case, the downlink subframe on the carrier needs to be classified into a group of two HARQ-ACK bits. However, the access network device 201 may further perform configuration, so that the terminal 202 feeds back a HARQ-ACK for two transport blocks in a downlink subframe in a HARQ-ACK space binding mode, and in this case, two transport blocks scheduled in a downlink subframe correspond to only one HARQ-ACK bit, that is, an ACK of one bit is fed back only when both the two transport blocks are correctly received, and otherwise, a NACK of one bit is fed back. In this case, one downlink subframe including two transport blocks corresponds to feedback of one HARQ-ACK bit. Therefore, the downlink subframe on the carrier needs to be classified into a group of one HARQ-ACK bit. Alternatively, the downlink subframe on the carrier is classified into another group of one HARQ-ACK bit, that is, the group, obtained after space binding, of one HARQ-ACK bit and the group in which one transport block corresponds to one HARQ-ACK bit are two independent groups.

As described above, when UE fails to receive the downlink scheduling information, because different transmission modes are configured for different carriers, the UE cannot determine a quantity of bits to be filled in a HARQ-ACK.

There may be a plurality of optional solutions to this problem, and two solutions are used as examples below for description.

Optional Solution 1

In this solution, the set M of preconfigured downlink subframes may be divided into N subsets of preconfigured downlink subframes. N is an integer greater than or equal to 2, a bit quantity of a hybrid automatic repeat request-acknowledgement HARQ-ACK that needs to be fed back by the terminal 202 for each downlink subframe in the subset of preconfigured downlink subframes is a predetermined value such as 1 bit or 2 bits, and bit quantities of HARQ-ACKs that need to be fed back for any downlink subframes in different downlink subframes are different.

In this case, a quantity of subsets of preconfigured downlink subframes depends on a quantity of possible values of a bit quantity of a HARQ-ACK that needs to be fed back. For example, if a bit quantity of a HARQ-ACK that needs to be fed back for the set M of preconfigured downlink subframes has two different values, the set M of preconfigured downlink subframes may be divided into two subsets of preconfigured downlink subframes. For another example, if a bit quantity of a HARQ-ACK that needs to be fed back for the set M of preconfigured downlink subframes has three different values, the set M of preconfigured downlink subframes may be divided into three subsets of preconfigured downlink subframes. Certainly, if a bit quantity of a HARQ-ACK that needs to be fed back for the set M of preconfigured downlink subframes has only one value, the set M of preconfigured downlink subframes does not need to be divided.

For example, N=2, and the set M of preconfigured downlink subframes is divided into a first subset of preconfigured downlink subframes and a second subset of preconfigured downlink subframes. Because an instantly scheduled downlink subframe set is a subset of the set of preconfigured downlink subframes, the instantly scheduled downlink subframe set is divided into a first instantly scheduled downlink subframe subset and a second instantly scheduled downlink subframe subset, the first instantly scheduled downlink subframe subset is a subset of the first subset of preconfigured downlink subframes, and the second instantly scheduled downlink subframe subset is a subset of the second subset of preconfigured downlink subframes.

For another example, if a bit quantity of a HARQ-ACK that needs to be fed back for the set M of preconfigured downlink subframes has three different values, the set M of preconfigured downlink subframes may be divided into three subsets of preconfigured downlink subframes. Certainly, if a bit quantity of a HARQ-ACK that needs to be fed back for the set M of preconfigured downlink subframes has only one value, the set M of preconfigured downlink subframes does not need to be divided.

Optional Solution 2

In this solution, the set M of preconfigured downlink subframes may be divided into P subsets of preconfigured downlink subframes. P is an integer greater than or equal to 2, and a bit quantity of a HARQ-ACK that needs to be fed back by the terminal 202 for each downlink subframe in the subset of preconfigured downlink subframes is a predetermined value such as 1 bit or 2 bits. A difference from the optional solution 1 is that it does not need to be defined that bit quantities of HARQ-ACKs that need to be fed back for any downlink subframes in different subsets of preconfigured downlink subframes are different.

The terminal 202 can correctly fill in a NACK provided that bit quantities of HARQ-ACKs that need to be fed back for downlink subframes in a same subset of preconfigured downlink subframes are the same.

In this case, a quantity of subsets of preconfigured downlink subframes is greater than or equal to a quantity of values of a bit quantity of a HARQ-ACK that needs to be fed back. For example, if a bit quantity of a HARQ-ACK that needs to be fed back for the set M of preconfigured downlink subframes has two different values, the preconfigured downlink subframe M may be divided into three or four subsets of preconfigured downlink subframes or the like provided that bit quantities of HARQ-ACKs that need to be fed back for downlink subframes in a same subset of preconfigured downlink subframes are the same.

The solution may be applied to the following scenario, to resolve a problem of an insufficient uplink subframe capacity.

A capacity of one uplink subframe is usually limited, and when HARQ-ACKs for a plurality of downlink subframes need to be fed back in a same uplink subframe, load of the uplink subframe is relatively large. Currently, in a CA mode, a HARQ-ACK is sent in an uplink subframe on a primary component carrier, and in consideration of a limited capacity of the uplink subframe on the primary component carrier, HARQ-ACKs for some downlink subframes may be sent in an uplink subframe on a secondary component carrier. In this case, downlink subframes that are in the set M of preconfigured downlink subframes and for which HARQ-ACKs that need to be fed back have a same bit quantity are further classified into a plurality of subsets of preconfigured downlink subframes, and some subsets of preconfigured downlink subframes are sent in the downlink subframe on the secondary component carrier, so that the problem of an insufficient uplink subframe capacity of the primary component carrier is resolved. Optionally, the uplink subframe on the secondary component carrier and the uplink subframe on the primary component carrier have a same subframe number, so that a HARQ-ACK time sequence relationship does not need to be redefined.

The foregoing two optional solutions are merely examples. It can be learned from the foregoing two solutions that when the set M of preconfigured downlink subframes is divided into a plurality of subsets of preconfigured downlink subframes, the terminal 202 can correctly fill in a NACK and the access network device 201 can correctly receive the HARQ-ACK provided that bit quantities of HARQ-ACKs that need to be fed back for downlink subframes in a same subset of preconfigured downlink subframes are the same and are a predetermined value known to both the access network device 201 and the terminal 202.

6. In step S305, the terminal 202 generates the HARQ-ACK codebook.

The HARQ-ACK codebook generated by the terminal 202 may include HARQ-ACK bits of all subframes in the set M of preconfigured downlink subframes, or may include HARQ-ACK bits of all scheduled downlink subframes in the set M of preconfigured downlink subframes, that is, HARQ-ACK bits of all downlink subframes in the foregoing instantly scheduled downlink subframe set.

The terminal 202 may determine, based on the time sequence relationship specified in Table 2 and according to the receiving status of the downlink data scheduled by the received downlink scheduling information and the bit quantity of the HARQ-ACK that needs to be fed back for the downlink subframe, an information bit of an original HARQ-ACK that needs to be fed back in the uplink subframe (for example, the foregoing uplink subframe 2), to generate the HARQ-ACK codebook. Optionally, if the terminal 202 further receives the foregoing special downlink control channel in step S302, the terminal 202 may further perform the determining according to a receiving status of the special downlink control channel.

Optionally, the HARQ-ACK codebook may be corresponding to the foregoing instantly scheduled downlink subframe set. The instantly scheduled downlink subframe set includes a downlink subframe in which the access network device 201 schedules downlink data transmission, and if the access network device 201 further sends the special downlink control channel, the instantly scheduled downlink subframe set further includes a subframe in which the special downlink control channel is located. In the following embodiments, it is assumed that there is no special downlink control channel unless otherwise specified, but this embodiment of the present invention may be applied to a case in which there is a downlink data channel and a special downlink control channel As described above, in this embodiment of the present invention, if the set M of preconfigured downlink subframes is divided into N subsets of preconfigured downlink subframes, the HARQ-ACK codebook generated by the terminal 202 may include at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including the downlink subframe in which the terminal receives the downlink scheduling information.

If the HARQ-ACK codebook generated by the terminal 202 includes only the HARQ-ACK bits of all the scheduled downlink subframes in the set M of preconfigured downlink subframes, that is, the HARQ-ACK bits of all the downlink subframes in the instantly scheduled downlink subframe set, when no downlink subframe is scheduled in one or more of the N subsets of preconfigured downlink subframes, or when the terminal 202 receives no downlink scheduling information of any downlink subframe in one or more of the N subsets of preconfigured downlink subframes, the HARQ-ACK codebook generated by the terminal 202 may not include a HARQ-ACK bit corresponding to a subset of preconfigured downlink subframes in which no downlink subframe is scheduled.

If the HARQ-ACK codebook generated by the terminal 202 includes the HARQ-ACK bits of all the subframes in the set M of preconfigured downlink subframes, when generating the HARQ-ACK codebook, the terminal 202 may generate a sub-codebook corresponding to each of the N subsets of preconfigured downlink subframes. Optionally, the terminal 202 may form a HARQ-ACK codebook by cascading N generated sub-codebooks.

If the HARQ-ACK codebook generated by the terminal 202 includes only the HARQ-ACK bits of all the scheduled downlink subframes in the set M of preconfigured downlink subframes, that is, the HARQ-ACK bits of all the downlink subframes in the instantly scheduled downlink subframe set, when generating the HARQ-ACK codebook, the terminal 202 may generate a sub-codebook corresponding to each of N instantly scheduled downlink subframe subsets. Optionally, the terminal 202 may form a HARQ-ACK codebook by cascading N generated sub-codebooks.

As described above, the terminal 202 and the access network device 201 need to know the division rule of the set M of preconfigured downlink subframes in advance, and the rule is the same for the terminal 202 and the access network device 201. Herein, when generating the HARQ-ACK codebook by means of cascading, the terminal 202 also needs to use a rule that both the terminal 202 and the access network device 201 know in advance. For example, during cascading, according to the bit quantity of the HARQ-ACK that needs to be fed back, the terminal 202 places, at a front location, a sub-codebook corresponding to a subset of preconfigured downlink subframes with a smaller bit quantity of a HARQ-ACK that needs to be fed back, and places, at a back location, a sub-codebook corresponding to a subset of preconfigured downlink subframes with a larger bit quantity of a HARQ-ACK that needs to be fed back. In this way, the access network device 201 also parses the HARQ-ACK codebook according to a same rule, and therefore a HARQ-ACK bit can be accurately learned.

7. In step S305, the terminal 202 generates the uplink control information by performing channel encoding on the generated HARQ-ACK codebook.

The terminal 202 performs channel encoding on the HARQ-ACK codebook after generating the codebook. In this embodiment of the present invention, a type of channel encoding is not limited, and the channel encoding may be various channel encoding such as linear block encoding, convolutional coding, or Turbo coding. If the linear block encoding such as Reed Muller (RM) coding is used, cyclic redundancy check (CRC) usually does not need to be added before encoding. If the convolutional coding or the Turbo coding is used, CRC may be added before encoding, and certainly, CRC may be not added before encoding. This is not limited in this embodiment of the present invention.

Optionally, the terminal 202 may use different encoding manners and CRC adding manners according to a codebook size. For example, when the codebook size is greater than a preset threshold, the convolutional coding is used, and in this case, CRC is added; when the codebook size is less than or equal to the preset threshold, the RM code is used, and in this case, CRC may be not added.

8. Step S306. The terminal 202 sends the uplink control information to the access network device 201.

The LTE system is used as an example. The terminal 202 may send, on a PUCCH or a PUSCH, the uplink control information generated in step S305.

After performing the channel encoding and before sending the uplink control information, the terminal 202 further needs to map encoded HARQ-ACK information to a physical resource. The physical resource may be a PUCCH resource or a PUSCH resource. Herein, the PUCCH resource is used as an example to describe how the terminal 202 determines the physical resource.

Optionally, the terminal 202 may determine the PUCCH resource according to resource indication information. The terminal 202 obtains a PUCCH resource set, and the PUCCH resource set includes a PUCCH resource of at least one PUCCH format. The terminal 202 determines the PUCCH resource from the PUCCH resource set according to the resource indication information.

Specifically, the terminal 202 may receive high-layer signaling such as RRC signaling in advance, and obtain the PUCCH resource set configured by the access network device 201 for the terminal 202, and the set includes at least two PUCCH resources. The PUCCH resources included in the set may be in a same format, for example, a PUCCH format (for example, a format 3) in the LTE system in a current CA mode or a new PUCCH format (for example, a PUCCH format 4 that is based on a PUSCH channel structure); or at least two PUCCH formats may be included, for example, the foregoing format 3 and format 4, or at least two new formats.

Then, the terminal 202 determines a first PUCCH resource from the PUCCH resource set according to the resource indication information. The resource indication information may include a downlink control channel used for currently scheduling a downlink data channel, and may specifically include a bit or another implicit status combination on the control channel, such as a newly added bit, or a reused current transmit power control (TPC) field.

Optionally, different PUCCH formats may be used for different codebook sizes, to carry HARQ-ACKs, for example, the format 4 is used for a codebook size greater than a threshold, and the format 3 is used for a codebook size less than or equal to the threshold. Specifically, a correspondence may be established between different states of the resource indication information and different PUCCH formats, and then the PUCCH format and the PUCCH resource are determined according to the resource indication information. Alternatively, a relationship among resource indication information, a codebook size, and a PUCCH format is established, and then the PUCCH resource and the PUCCH format are determined according to the received resource indication information and the determined codebook size.

9. Step S307. The access network device 201 receives the uplink control information, obtains the HARQ-ACK codebook, and determines the receiving status of the downlink data.

After receiving the downlink control information sent by the terminal 202, the access network device 201 obtains the HARQ-ACK codebook after performing channel decoding in a channel encoding manner the same as that used by the terminal 202.

If the terminal 202 combines a plurality of sub-codebooks into a HARQ-ACK codebook by means of cascading when generating the HARQ-ACK codebook, the access network device 201 also parses, in a cascading manner the same as that used by the terminal 202, the plurality of sub-codebooks included in the HARQ-ACK codebook.

Optionally, the access network device 201 determines, according to the pre-learned division rule that is of the set M of preconfigured downlink subframes and that is the same as that of the terminal 202, the bit quantity of the HARQ-ACK that needs to be fed back for the downlink subframe in each subset of preconfigured downlink subframes, and parses the HARQ-ACK codebook, so that a HARQ-ACK that is fed back by the terminal 202 for each downlink subframe is accurately learned, and further, the status of receiving the downlink data in the downlink subframe by the terminal 202 is determined.

EMBODIMENT 2

Figure 2B:
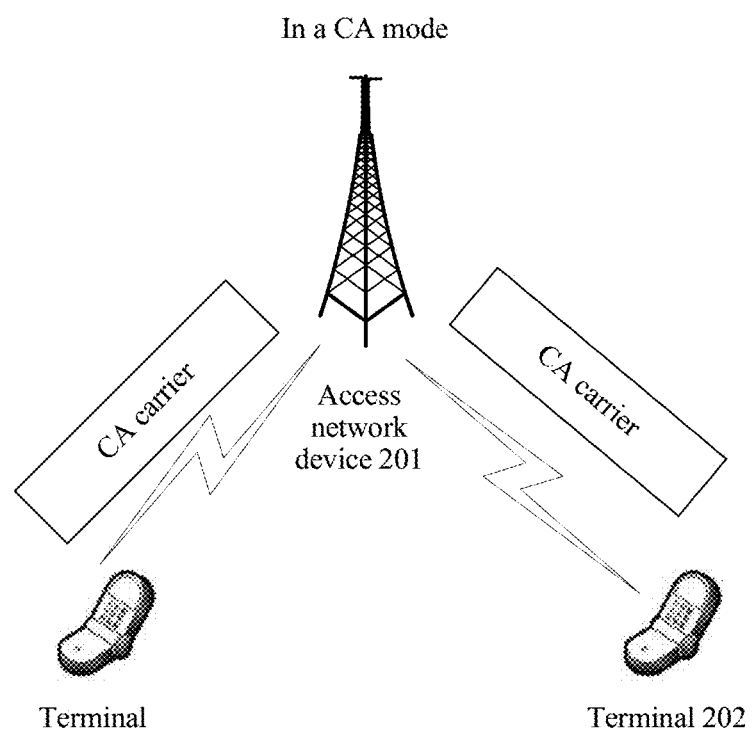
FIG. 2B is a schematic structural diagram of a second wireless communication system according to Embodiment 2 of the present invention.

For a structure of a wireless communications system provided in Embodiment 2, refer to FIG. 2B.

In Embodiment 2, a set M of preconfigured downlink subframes is not divided into subsets, a terminal 202 feeds back a HARQ-ACK only for a downlink subframe scheduled by an access network device 201, and the terminal 202 determines whether downlink scheduling information is undetected, so that the terminal 202 fills in a NACK for a HARQ-ACK at an undetected location, to generate a HARQ-ACK codebook consistent with that understood by the access network device 201.

A process of downlink scheduling, downlink data transmission, and HARQ-ACK information feedback between the access network device 201 and the terminal 202 is described below with reference to FIG. 4. The process includes the following steps:

S401. The access network device 201 sends downlink scheduling information of a downlink subframe F(i, j) and indication information to the terminal 202.

S402. The terminal 202 receives the downlink scheduling information and the indication information.

S403. The access network device 201 sends, in the downlink subframe F(i, j), downlink data scheduled by the downlink scheduling information sent in step S401.

S404. The terminal 202 determines, according to the downlink scheduling information and the indication information that are received in step S402, a downlink subframe scheduled by the access network device 201, for example, the terminal 202 determines, according to the received downlink scheduling information, a downlink subframe scheduled by the received downlink scheduling information, and determines, according to the indication information, a downlink subframe that is scheduled by the access network device 201 according to downlink scheduling information undetected by the terminal 202, so as to determine a downlink subframe actually scheduled by the access network device 201, that is, a downlink subframe instantly scheduled by the access network device 201; and receives, in the determined downlink subframe scheduled by the access network device 201, downlink data scheduled by the downlink scheduling information.

S405. The terminal 202 generates a HARQ-ACK codebook according to a receiving status of the downlink data received in the downlink subframe F(i, j) and a bit quantity of a HARQ-ACK that needs to be fed back for the downlink subframe F(i, j), and generates uplink control information by encoding the generated HARQ-ACK codebook.

S406. The terminal 202 sends the generated uplink control information to the access network device 201.

S407. The access network device 201 obtains the HARQ-ACK codebook after decoding the received uplink control information, and determines, according to the obtained HARQ-ACK codebook, the receiving status of the downlink data in the downlink subframe F(i, j) that is scheduled in a set M of preconfigured downlink subframes.

Figure 4:
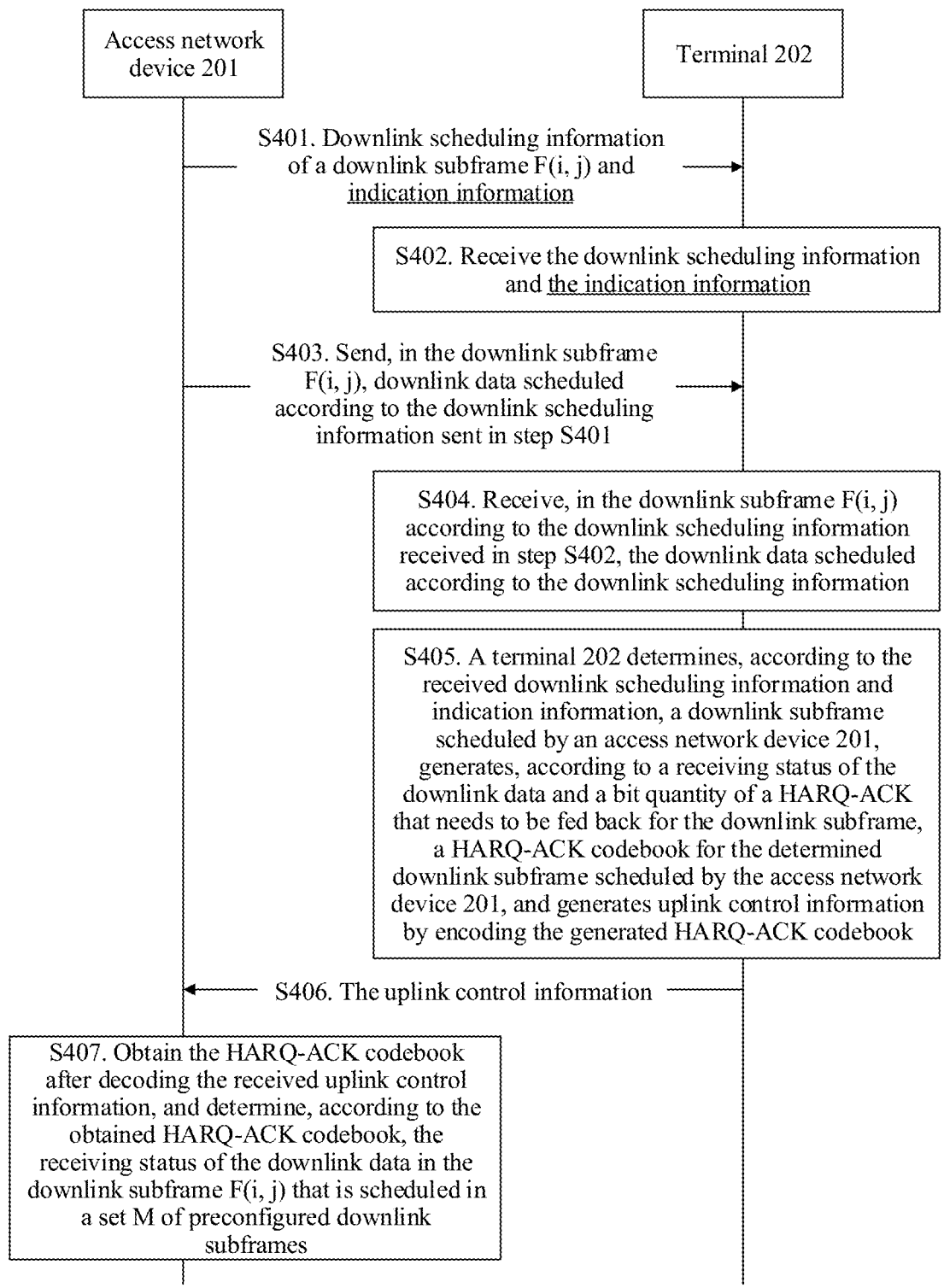
FIG. 4 is a flowchart of data transmission between an access network device and a terminal in a second wireless communications system according to Embodiment 2 of the present invention and a third wireless communications system according to Embodiment 3 of the present invention.

It can be learned after comparing FIG. 4 and FIG. 3 that, in the steps shown in FIG. 4, in step S401, the access network device 201 sends not only the downlink scheduling information but also the indication information to the terminal 202, and in step S402, the terminal 202 receives not only the downlink scheduling information but also the foregoing indication information sent by the access network device 201. For a specific implementation of the indication information, refer to subsequent descriptions.

In step S405, the terminal 202 needs to determine, according to the received downlink scheduling information and indication information, the downlink subframe scheduled by the access network device 201, and generate, according to the receiving status of the downlink data and the bit quantity of the HARQ-ACK that needs to be fed back for the downlink subframe, the HARQ-ACK codebook for the downlink subframe scheduled by the access network device 201.

In step S407, the access network device 201 obtains the HARQ-ACK codebook after decoding the received uplink control information. In this case, the access network device 201 needs to parse the HARQ-ACK codebook according to the scheduled downlink subframe instead of the set M of preconfigured downlink subframes, to obtain the receiving status of the downlink data in the scheduled downlink subframe.

Step S401 and step S403 may be completed in a same step. For example, for an LTE system, the access network device 201 sends, in a same downlink subframe used for sending the downlink scheduling information, the downlink data scheduled by the downlink scheduling information. In this case, step S402 and step S404 may also be completed in a same step. The terminal 202 may receive downlink data in a downlink subframe according to received downlink scheduling information in the same downlink subframe.

In addition, to send downlink scheduling information in a downlink subframe m and schedule the terminal to receive downlink data that is in a downlink subframe m+1, the access network device 201 may use a manner shown in FIG. 4: sending the scheduling information before sending the downlink data. Accordingly, the terminal 202 receives the downlink scheduling information first, and then receives the downlink data according to the received downlink scheduling information. Alternatively, a case in which downlink scheduling information is sent in a downlink subframe m on a carrier 1 and the terminal is scheduled to receive downlink data that is in a downlink subframe m on a carrier 2 is equivalent to that the downlink scheduling information and the downlink data scheduled by the downlink scheduling information are sent and received in a downlink subframe at a same moment, but the downlink scheduling information and the downlink data scheduled by the downlink scheduling information are on different carriers.

In addition, the indication information may be sent together with the downlink scheduling information, or may be sent separately, for example, be sent by using separate signaling. One downlink subframe F(i, j) may correspond to one piece of indication information, or a plurality of downlink subframes may correspond to one piece of indication information.

In Embodiment 2, the HARQ-ACK codebook generated by the terminal 202 includes only the HARQ-ACK for the downlink subframe scheduled by the access network device 201. Therefore, a size of the HARQ-ACK codebook is reduced, and in comparison with feeding back HARQ-ACKs for all downlink subframes in the set M of preconfigured downlink subframes, occupation of an uplink control channel such as a PUCCH is reduced and data transmission efficiency is improved. When parsing the HARQ-ACK codebook, the access network device 201 needs to parse only the HARQ-ACK for the scheduled downlink subframe, so that processing load of the access network device 201 is reduced.

The indication information is described in detail below.

In Embodiment 2, the HARQ-ACK codebook generated by the terminal 202 includes only the HARQ-ACK for the downlink subframe F(i, j) scheduled by the access network device 201, that is, the HARQ-ACK codebook is generated for the foregoing instantly scheduled downlink subframe set.

As shown in FIG. 5A to FIG. 5D, ten carriers are configured for the terminal 202, and each carrier is a TDD configuration 2. In this case, a set of preconfigured downlink subframes associated with an uplink subframe 2 on an uplink primary component carrier includes all downlink subframes 4, 5, 6, and 8 on all the ten carriers.

It is assumed that, in a specific scheduling scenario, an instantly scheduled downlink subframe set that is actually scheduled for the terminal 202 includes subframes 4 on carriers 1 to 7, subframes 5 on the carrier 1, the carrier 3, and the carrier 5, subframes 6 on the carriers 1 to 6, and subframes 8 on the carriers 1 to 5, and in this case, these currently actually scheduled downlink subframes form the instantly scheduled downlink subframe set. It can be learned that the instantly scheduled downlink subframe set is a subset of the foregoing set of preconfigured downlink subframes.

In this case, in Embodiment 2, a HARQ-ACK codebook that needs to be transmitted in the uplink subframe 2 on the uplink primary component carrier is determined according to the instantly scheduled downlink subframe set, that is, a HARQ-ACK codebook size in this case is 21. It is assumed herein that each downlink subframe corresponds to one HARQ-ACK bit.

The terminal 202 can accurately identify the instantly scheduled downlink subframe set according to the indication information, so that the access network device 201 and the terminal 202 have consistent understanding of the HARQ-ACK codebook. Optionally, the foregoing objective may be implemented by using the indication information. The indication information may be carried on a downlink control channel, and the downlink control channel may be the foregoing downlink control channel used for scheduling the downlink data channel in the downlink subframe, that is, a downlink control channel used for sending downlink scheduling information of the downlink subframe.

Optionally, the indication information may include first indication information and second indication information. The first indication information may be referred to as a "downlink assignment index (Downlink Assignment Index, DAI) index indicator", and the second indication information may be referred to as a "DAI end indicator".

The foregoing two pieces of indication information may be newly added bits or reused existing bits on the current downlink control channel, or may be implicit indicators that are not bits, for example, scrambling code or a combination of some statuses of some bits. Alternatively, the DAI end indicator may be carried on a separate control channel.

In the following, each downlink control channel includes a DAI index indicator of two bits and a DAI end indicator of two bits as an example, to describe in detail how to determine, by using these two DAI fields, the HARQ-ACK codebook that is determined based on the instantly scheduled downlink subframe set.

Values of the DAI index indicator on respective downlink control channels may be successively accumulated according to a sequence of carriers before subframes (certainly, another sequence is not excluded provided that the sequence is predefined). It should be noted that because currently there is only a DAI index of two bits, cyclic counting is required. For example, an [(X−1) mod 4]+1 rule may be used, that is, X=1, X=5, and X=9 all correspond to a value 1 of the DAI index indicator (which, for example, is represented by a state '00'), and X is an actual accumulated counting value.

In this way, if the terminal 202 does not detect some downlink control channels, for example, the terminal 202 successively receives downlink control channels whose DAI indexes are 1 and 4, the terminal 202 may learn that two downlink control channels, between the downlink control channels whose DAI indexes are 1 and 4, whose DAI indexes are respectively 2 and 3 are undetected. In this way, when determining the HARQ-ACK codebook, the terminal 202 may put two 0 bits at HARQ-ACK bit locations associated with downlink subframes corresponding to the foregoing two undetected downlink control channels, that is, fill in NACKs.

However, if only the DAI index indicator is used, although it can be found that a downlink control channel between two received downlink control channels is undetected, an undetected downlink control channel that is at the end cannot be found. For example, it is assumed that the access network device 201 schedules four downlink control channels in total, and values of DAI index indicators are successively 1, 2, 3, and 4, but the terminal 202 receives only three downlink control channels whose values of DAI index indicators are 1, 2, and 3. In this case, the terminal 202 cannot find that the last downlink control channel is undetected.

To resolve a problem that the last downlink control channel is undetected, the DAI end indicator may be optionally introduced. Certainly, this method is not a unique method for determining that the last downlink control channel is undetected. For example, if UE fails to determine that the last downlink control information is undetected, CRC check of the access network device 201 fails, and therefore the access network device 201 may determine that the HARQ-ACK codebook fed back by the terminal 202 is incorrect. Once the CRC check of the access network device 201 fails, the access network device 201 considers that each HARQ-ACK bit in the HARQ-ACK codebook currently fed back by the terminal 202 is a NACK, and the access network device 201 subsequently starts physical layer retransmission scheduling. In addition, the CRC check ensures that the access network device 201 does not incorrectly detect a NACK of the terminal 202 as an ACK, so as to prevent a severe error event that a NACK is incorrectly determined as an ACK. The error event causes physical layer packet loss, that is, the access network device 201 considers that the terminal 202 correctly receives downlink data that is actually not correctly received, and therefore the access network device 201 subsequently starts higher layer retransmission such as Radio Link Control (RLC) layer retransmission instead of physical layer retransmission. Compared with the physical layer retransmission, the higher layer retransmission greatly reduces resource utilization efficiency of a system.

It should be noted that, in the foregoing method in which the access network device 201 determines, with reference to CRC and the DAI index indicator, that the HARQ-ACK codebook is incorrect, once the access network device 201 determines that the HARQ-ACK codebook is incorrect, retransmission scheduling of all downlink subframes fed back according to the HARQ-ACK codebook needs to be started. Downlink data that is in a downlink subframe and that is correctly received by the terminal 202 also needs to be retransmitted. Therefore, data transmission efficiency is still not high in some sense. Therefore, optionally, the terminal 202 may determine, according to a DAI end indicator described below, that the last downlink scheduling information is undetected. This method significantly improves data transmission efficiency compared with the method of using the CRC and the DAI index indicator.

Optional implementations of the DAI end indicator are described below.

Optional Implementation 1

As shown in FIG. 5A, the DAI end indicator is used to indicate a total quantity of PDSCHs scheduled in a current subframe in the instantly scheduled downlink subframe set. In a CA mode, the PDSCH scheduled in the current subframe may include each downlink subframe on aggregated carriers that has a same subframe number as the current subframe. A specific modulo rule of a value of a total DAI quantity is consistent with that of the DAI index indicator, that is, [(X−1) mod 4]+1.

Optional Implementation 2

As shown in FIG. 5B, the DAI end indicator is used to indicate a total quantity of PDSCHs scheduled in a current subframe and previous subframe(s) in the instantly scheduled downlink subframe set.

In addition, a method of predictive scheduling may be further used. For example, denominators in FIG. 5B are changed into 1. In this case, the DAI end indicator is used to indicate a total quantity of PDSCHs scheduled in the instantly scheduled downlink subframe set, but the access network device 201 needs to perform prediction during scheduling. For example, at a moment of scheduling a subframe 4, whether subframes 5, 6, and 8 need to be scheduled and an accurate quantity of scheduled subframes need to be predicted because values of a total DAI quantity on these downlink control channels need to be consistent. Such predictive scheduling causes specific implementation complexity.

For the optional implementations 1 and 2, it should be noted that the second indication information may be in each piece of downlink scheduling information used for scheduling the downlink subframe; or the second indication information does not need to be in downlink scheduling information used for scheduling the downlink subframe, and it only needs to be ensured that there is at least one piece of second indication information in a plurality of scheduled downlink subframes that have a specific subframe number, or it only needs to be ensured that there is at least one piece of second indication information in a plurality of scheduled downlink subframes in an instantly scheduled downlink subframe set.

Optional Implementation 3

As shown in FIG. 5C, the DAI end indicator is used to indicate last X PDSCHs in the instantly scheduled downlink subframe set, for example, X=3. In this case, values of DAI end indicators corresponding to the last three subframes are reversely set to 4, 3, and 2, and values of other DAI end indicators are 1.

Optional Implementation 4

As shown in FIG. 5D, the DAI end indicator is used to indicate the last X PDSCHs scheduled in each subframe in the instantly scheduled downlink subframe set, for example, X=3. In this case, values of DAI end indicators corresponding to the last three subframes in each subframe are reversely set to 4, 3, and 2, and values of other DAI end indicators in the subframe are 1.

In addition, a total quantity indicator of the DAI end indicators may further include a quantity of special downlink control channels, and the special downlink control channel is used for instructing to release a semi-persistent scheduling resource and is not used for scheduling a PDSCH. Moreover, an accumulated counting value of the DAI index indicator may further include the special downlink control channel The DAI index indicator and the DAI end indicator are used, so that even if some downlink control channels are undetected, the terminal 202 can still accurately restore a HARQ-ACK codebook corresponding to a downlink subframe actually scheduled by the access network device 201.

However, in the foregoing solutions, it is assumed that each downlink subframe corresponds to one HARQ-ACK bit. If different data channel transmission modes are configured for carriers, bit quantities of HARQ-ACKs corresponding to downlink subframes on different carriers may be different.

For example, LTE supports nine data channel transmission modes shown in Table 1, and in transmission modes 1, 2, 5, 6, and 7, a PDSCH scheduled in a downlink subframe is a single transport block, that is, each downlink subframe corresponds to one HARQ-ACK bit, and in transmission modes 3, 4, 8, and 9, a PDSCH scheduled in a downlink subframe may be two transport blocks, that is, each downlink subframe corresponds to two HARQ-ACK bits.

As described above, as technologies develop, in the CA mode, different transmission modes may be used for carriers configured for the terminal 202. The method, provided in Embodiment 2, of generating the HARQ-ACK codebook based on the instantly scheduled downlink subframe set may cause an error. For example:

As shown in FIG. 6, it is assumed that eight FDD carriers are configured for the terminal 202, and one downlink subframe is used as an example. It is assumed that a maximum quantity of transport blocks that can be scheduled in each downlink subframe configured for carriers 1 to 8 are successively {1, 2, 2, 2, 1, 1, 2, 1}, and the access network device 201 schedules downlink data channels in the downlink subframe on six carriers. According to the method in Embodiment 2, values of DAI index indicators on corresponding downlink control channels are successively {1, 2, 3, 4, 1, 2}.

It is assumed that the terminal 202 does not detect a downlink control channel in the downlink subframe on the carrier 4, and the terminal 202 may find, by using values 3 and 1 of two successive DAI index indicators, that a downlink control channel on which a value of a DAI index indicator is 4 is undetected, but the terminal 202 does not know whether the undetected downlink control channel is a downlink control channel on a carrier 4 or a carrier 5. The downlink subframe on the carrier 4 corresponds to two HARQ-ACK bits, and the downlink subframe on the carrier 5 corresponds to one HARQ-ACK bit. Therefore, the terminal 202 does not know to fill in one or two 0s. Consequently the terminal 202 and the access network device 201 may have inconsistent understanding of the HARQ-ACK codebook, and finally an error is caused when the access network device 201 parses the HARQ-ACK codebook.

In Embodiment 2, in the CA mode, different data channel transmission modes may be configured for different carriers of the terminal 202, and therefore maximum quantities of transport blocks scheduled in different downlink subframes may be unequal. Consequently, the solution of determining the HARQ-ACK codebook based on the instantly scheduled downlink subframe set is prone to an error. Therefore, a solution in Embodiment 3 is provided with reference to Embodiment 1 and Embodiment 2.

EMBODIMENT 3

A third wireless communications system is provided in Embodiment 3. A set M of preconfigured downlink subframes is divided into N subsets of preconfigured downlink subframes, and a terminal 202 determines an instantly scheduled downlink subframe subset in each subset of preconfigured downlink subframes according to the indication information provided in Embodiment 2, and generates a HARQ-ACK codebook for the instantly scheduled downlink subframe subset.

For a structure of the wireless communications system provided in Embodiment 3, also refer to FIG. 2A. For a process of downlink scheduling, downlink data transmission, and HARQ-ACK information feedback between an access network device 201 and the terminal 202, refer to FIG. 4.

In Embodiment 3, the access network device 201 sends not only downlink scheduling information but also the indication information described in Embodiment 2 to the terminal 202. In Embodiment 3, the terminal 202 feeds back a HARQ-ACK only for a downlink subframe scheduled by the access network device 201.

A difference between Embodiment 3 and Embodiment 2 lies in that, in Embodiment 3, the set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different.

In Embodiment 3, first indication information, that is, a DAI index indicator is for a subset of preconfigured downlink subframes, and first indication information corresponding to a downlink subframe F(i, j) in the subset of preconfigured downlink subframes is used to indicate a sequence number, according to a setting sequence, of the downlink subframe F(i, j) in scheduled downlink subframes in the subset of preconfigured downlink subframes including the downlink subframe F(i, j). For example, accumulative counting may be performed on the first indication information in the scheduled downlink subframe in the subset of preconfigured downlink subframes.

Accordingly, when the terminal 202 generates the HARQ-ACK codebook, the generated HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink scheduling information is received by the terminal 202.

The at least one sub-codebook is generated in the following manner:

The terminal 202 generates, for one of the at least one subset of preconfigured downlink subframes according to the sequence number indicated by the first indication information and according to a receiving status of downlink data received in the downlink subframe F(i, j) and a bit quantity of a HARQ-ACK that needs to be fed back for the downlink subframe F(i, j), a sub-codebook corresponding to the one subset of preconfigured downlink subframes.

In Embodiment 3, in addition to the first indication information, indication information further includes second indication information, that is, a DAI end indicator.

The second indication information corresponds to one subset of preconfigured downlink subframes, and the second indication information corresponding to one subset of preconfigured downlink subframes has a plurality of optional implementations. For example:

Optional Implementation 1

The second indication information is used to indicate a total quantity of scheduled downlink subframes that are in the subset of preconfigured downlink subframes including the downlink subframe F(i, j) and whose subframe numbers are j.

Optional Implementation 2

The second indication information is used to indicate a total quantity of a scheduled downlink subframe whose subframe number is j and a downlink subframe before the downlink subframe whose subframe number is j, where the scheduled downlink subframe whose subframe number is j and the downlink subframe before the downlink subframe whose subframe number is j are in the subset of preconfigured downlink subframes including the downlink subframe F(i, j).

Optional Implementation 3

The second indication information is used to indicate a total quantity of scheduled downlink subframes in the subset of preconfigured downlink subframes including the downlink subframe F(i, j).

Optional Implementation 4

The second indication information is used to indicate a total quantity of transport blocks transmitted in a scheduled downlink subframe that is in the subset of preconfigured downlink subframes including the downlink subframe F(i, j) and whose subframe number is j.

Optional Implementation 5

The second indication information is used to indicate a total quantity of transport blocks transmitted in a scheduled downlink subframe whose subframe number is j and a downlink subframe before the downlink subframe whose subframe number is j, where the scheduled downlink subframe whose subframe number is j and the downlink subframe before the downlink subframe whose subframe number is j are in the subset of preconfigured downlink subframes including the downlink subframe F(i, j).

Optional Implementation 6

The second indication information is used to indicate a total quantity of transport blocks transmitted in a scheduled downlink subframe in the subset of preconfigured downlink subframes including the downlink subframe F(i, j).

Optional Implementation 7

In the subset of preconfigured downlink subframes including the downlink subframe F(i, j), values of the second indication information corresponding to the last one, last but one, . . . , last but X−2, and last but X−1 of scheduled downlink subframes sorted according to the setting sequence are respectively $A_{X-1}$, $A_{X-2}$, . . . $A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes including the downlink subframe F(i, j), and $A_{X-1}$, $A_{X-2}$, . . . , $A_1$, and $A_0$ are different values. X is a positive integer greater than 1.

Optional Implementation 8

In the subset of preconfigured downlink subframes including the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$. X is a positive integer greater than 1.

Optional Implementation 9

In the subset of preconfigured downlink subframes including the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}$, $A_{X-2}$, . . . , $A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes including the downlink subframe F(i, j), and $A_{X-1}$, $A_{X-2}$, . . . , $A_1$, and $A_0$ are different values. X is a positive integer greater than 1.

Optional Implementation 10

Values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$.

Optional Implementation 11

The second indication information is used to indicate a bit quantity of a sub-codebook corresponding to the subset of preconfigured downlink subframes including the downlink subframe F(i, j), and the bit quantity may also be referred to as a codebook size. The codebook size is less than a bit quantity of a HARQ-ACK corresponding to the subset of preconfigured downlink subframes but is greater than or equal to a quantity of downlink subframes in the instantly scheduled downlink subframe subset or a quantity of transport blocks. When the codebook size is greater than the quantity of downlink subframes in the instantly scheduled downlink subframe subset or the quantity of transport blocks, both UE and a base station determine that at least one NACK is filled in at the end of the codebook, and a specific quantity of filled-in NACKs is the codebook size minus a quantity of downlink subframes that are in the instantly scheduled downlink subframe subset and in which downlink data is actually scheduled or the quantity of transport blocks. For example, ten carriers are configured for the UE, each carrier is a TDD uplink-downlink configuration 2, subframes 4, 5, 6, and 8 that are on the ten carriers and that are corresponding to an uplink subframe 2 are used as examples, and for each of N groups, when the base station schedules downlink data for the UE in the subframe 4, it is pre-estimated that a quantity of downlink subframes that are in the instantly scheduled downlink subframe subset and in which downlink data of the UE is actually scheduled is X. X meets the following formula: [(X−1) mod 4]+1=2. Then the base station performs scheduling for the UE in the subframes 5, 6, and 8, but finally, due to a specific reason, a quantity of downlink subframes that are in the instantly scheduled downlink subframe subset and in which the base station actually schedules the downlink data of the UE is 20. The reason includes a control channel capacity, or that another UE has a higher priority than the UE or scheduling on an unauthorized carrier further needs to depend on a load status on the carrier, or the like. The quantity of finally actually scheduled downlink subframes is 20, and a pre-estimated actual value of X may be finally determined as 22. Therefore, according to this rule, both the UE and the base station construe a codebook size of a HARQ-ACK codebook in this case as 22 bits, locations of the first 20 bits of the 22 bits correspond to downlink subframes in the instantly scheduled downlink subframe subset that are actually scheduled, and NACKs are filled in at locations of the last two bits. Alternatively, if the base station finally determines that a quantity of downlink subframes that are in the instantly scheduled downlink subframe subset and in which the UE is actually scheduled is 16, X may be understood as 18, and NACKs are filled in at locations of the last two bits of the HARQ-ACK codebook. In this embodiment, the base station may pre-estimate a codebook size of one HARQ-ACK codebook, and after actually scheduling the UE in an instantly scheduled downlink subframe subset, finally determine a location of a HARQ-ACK bit corresponding to downlink data actually scheduled in the HARQ-ACK codebook, and fill in a NACK at another location. Therefore, a predictive scheduling problem is avoided, and the foregoing flexible X parsing does not limit a quantity of scheduled subframes. Alternatively, N numbers of actually scheduled downlink subframes may be configured for the UE, where N is greater than 1, and then a total DAI quantity is used for instructing to dynamically select one of the N numbers as a current HARQ-ACK codebook size. In this solution, predictive scheduling may be not required either, that is, a NACK is filled in for the dynamically selected codebook size, but this solution is not as flexible as the method in the foregoing embodiment because once the dynamically selected codebook size is determined, an actually scheduled downlink subframe in a current instantly scheduled downlink subframe subset cannot be determined at random.

In this case, when generating a sub-codebook corresponding to the subset of preconfigured downlink subframes, the terminal 202 may generate, according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to a subset of preconfigured downlink subframes.

In the foregoing descriptions of the first indication information and the second indication information, the involved setting sequence may include a sequence between a carrier and a subframe, a carrier sequence, and a subframe sequence.

The sequence between a carrier and a subframe may include: carriers before subframes, or subframes before carriers.

The carrier sequence may include: ascending order of carrier indexes, or descending order of carrier indexes. The subframe sequence includes: ascending order of subframe moments, or descending order of subframe moments.

The set M of preconfigured downlink subframes is divided into N subsets of preconfigured downlink subframes, bit quantities of HARQ-ACKs that need to be fed back for downlink subframes in different subsets of preconfigured downlink subframes are different, and bit quantities of HARQ-ACKs that need to be fed back in downlink subframes in a same subset of preconfigured downlink subframes are the same. The first indication information and the second indication information are corresponding to a subset of preconfigured downlink subframes instead of the set M of preconfigured downlink subframes. In this way, the terminal 202 can accurately determine, according to the first indication information, optionally, also according to the second indication information, a subset of preconfigured downlink subframes in which downlink scheduling information is undetected, and the terminal 202 also learns, in advance, a bit quantity of a HARQ-ACK that needs to be fed back in one subset of preconfigured downlink subframes. In this way, when it is determined that the downlink scheduling information is undetected, a correct quantity of HARQ-ACKs can be filled in.

In the following, refer to example descriptions in FIG. 7A and FIG. 7B. Ten carriers of the terminal 202 are classified into two groups according to data channel transmission modes. Carriers {1, 4, 5, 7, 10} are a first group, 20 downlink subframes, that is, downlink subframes 4, 5, 6, and 8 on the first group of carriers form a first subset of preconfigured downlink subframes, and a PDSCH that is scheduled in each subframe in a current data channel transmission mode corresponds to one transport block, that is, corresponds to one HARQ-ACK bit. Carriers {2, 3, 6, 8, 9} are a second group, 20 downlink subframes, that is, downlink subframes 4, 5, 6, and 8 on the second group of carriers form a second subset of preconfigured downlink subframes, and a PDSCH that is scheduled in each subframe in the current data channel transmission mode corresponds to two transport blocks, that is, corresponds to two HARQ-ACK bits.

For the first subset of preconfigured downlink subframes, actually scheduled downlink subframes are subframes 4 and subframes 6 on all the first group of carriers, subframes 5 on the carriers 1, 4, 5, and 10, and subframes 8 on the carriers 1 and 4. These subframes form a first instantly scheduled downlink subframe subset.

HARQ-ACKs in a first sub-codebook corresponding to the first instantly scheduled downlink subframe subset are sorted according to a setting sequence, and optionally, this may be specifically identified by the first indication information, that is, a DAI index indicator according to a positive sequence of carriers before subframes. The DAI index indicator may be on each downlink control channel used for scheduling the first instantly scheduled downlink subframe subset. If there is the special downlink control channel, the DAI index indicator may further be on the special downlink control channel. Alternatively, if there is only the special downlink control channel, the DAI index indicator is only on the special downlink control channel. A value of the DAI index indicator may be accumulatively counted according to the positive sequence of carriers before subframes. The positive sequence herein may be specifically ascending order or descending order of carrier indexes (index) that may also be referred to as carrier sequence numbers, and then ascending order of subframe moments. Another carrier arrangement manner is not excluded provided that a sequence is predefined.

Herein, the DAI index indicator may occupy two bits that represent four states {00, 01, 10, 11}. If the DAI index indicator is accumulatively counted according to the setting sequence in the downlink subframes scheduled in the subset of preconfigured downlink subframes, accumulated counting values may be respectively {1, 2, 3, 4}. If a value exceeds 4, cyclic counting may be performed, that is, {1, 2, 3, 4, 5(1), 6(2), 7(3), ...}. Specifically, a formula $Y=[(X-1) \bmod 4]+1$ may be used for representation. X is a counting value in actual accumulative counting, for example, 1 to 7. Y is a value obtained after cyclic modulo, that is, corresponds to {1, 2, 3, 4, 1, 2, 3}. Certainly, another counting manner is not excluded, for example, {0, 1, 2, 3, 0, 1, 2, 3, ...}. The DAI index indicator of two bits is also a specific example, and a solution of a DAI index indicator of another bit quantity is similar and is not excluded.

As described above, the terminal 202 can determine an undetected downlink control channel between two downlink control channels based on the DAI index indicator, but cannot determine an undetected downlink control channel that is at the end. In this case, CRC used before channel encoding may be used. For example, if the UE fails to determine that the downlink control channel that is at the end is undetected, CRC check of the access network device 201 fails. Therefore, the access network device 201 may determine that the HARQ-ACK codebook fed back by the terminal 202 is incorrect, so that physical layer retransmission is performed.

Optionally, the access network device 201 may send the second indication information in addition to the first indication information, so that the terminal can determine whether the last one to several downlink control channels in the instantly scheduled downlink subframe subset are undetected, or determine a status of the last one to several downlink control channels in each subframe.

Herein, a DAI end indicator of two bits is used as an example. Herein, it is assumed that the DAI end indicator is on each downlink control channel used for scheduling the instantly scheduled downlink subframe subset, and may certainly be on only some of downlink control channels used for scheduling downlink data channels. In addition, the DAI end indicator may further be on another special downlink control channel that is not used for scheduling these downlink data channels, for example, at least one such special downlink control channel is sent in each subframe or at least one such special downlink control channel is sent in each instantly scheduled downlink subframe subset. These extended embodiments are not excluded.

As described above, the DAI end indicator may be set by using a plurality of methods. The DAI end indicator may be independently set in each downlink subframe, or a plurality of downlink subframes correspond to a same DAI end indicator.

For example, for the optional implementation 1 in Embodiment 3, the DAI end indicator may be independently set in each downlink subframe, to indicate a quantity of PDSCHs scheduled in the current subframe.

For the optional implementation 4 in Embodiment 3, the DAI end indicator may be independently set in each subframe, to indicate a quantity of transport blocks (Transport Block, TB) scheduled in the current subframe.

As shown in FIG. 7A, a DAI end indicator is independently set in each subframe in the first instantly scheduled downlink subframe subset, and a value of the DAI end indicator represents a total quantity of downlink data channels scheduled in the current subframe. The total quantity may include or may not include a downlink data channel used for SPS because the downlink data channel used for SPS is not instantly scheduled, but a period and a specific subframe location are pre-determined. Therefore, whether the downlink data channel used for SPS is counted in the foregoing DAI total quantity indicator or not is feasible provided that a rule is defined. In addition, if the special downlink control channel is taken into consideration. The value of the DAI total quantity indicator also needs to include the special downlink control channel, that is, a total quantity of downlink data channels in the current subframe and a total quantity of special downlink control channels need to be taken into consideration.

The value of the DAI end indicator may also be specifically set in a cyclic modulo manner. A DAI total quantity indicator of two bits is used as an example (a similar method is used for setting a DAI total quantity indicator of another bit quantity). A formula $Y=[(X-1) \mod 4]+1$ may be used. X is an actual value of a total quantity, for example, a total quantity of subframes 4 is 7; Y is a value obtained after cyclic modulo, for example, a value of the total quantity of subframes 4 is set to 1.

In this method, the access network device 201 does not need to perform prediction in advance during scheduling, so that scheduling complexity is reduced. For example, when the access network device 201 schedules data in a subframe n, only a total quantity of downlink data channels scheduled in the current subframe n needs to be considered for a specified DAI total quantity indicator, and a quantity of subframes used for data scheduling in a subframe n+1 and specific subframe locations do not need to be predicted during scheduling in the subframe n. In addition, counting values of previous subframes may be further accumulated in each subframe, and this is specifically shown in a method in FIG. 5B.

For another example, for the optional implementation 7, the DAI end indicator may be independently set in each subframe, and indicates the last X-1 PDSCHs scheduled in the current subframe.

As shown in FIG. 7B, in the first instantly scheduled downlink subframe subset, values of the second indication information corresponding to the last one, last but one, . . . , last but X-2, and last but X-1 of downlink subframes scheduled by the setting sequence are respectively $A_{X-1}, A_{X-2}, \ldots, A_1$, and $A_0$, values of the second indication information corresponding to other downlink subframes are respectively $A_0$, the other downlink subframes are downlink subframes, other than the last one, last but one, . . . , last but X-2, and last but X-1 of the sorted scheduled downlink subframes, in the subset of preconfigured downlink subframes including the downlink subframe F(i, j), and $A_{X-1}, A_{X-2}, \ldots, A_1$, and $A_0$ are different values. X is a positive integer greater than 1. Optionally, X is a $Y^{th}$ power of 2, and Y is a bit quantity of the DAI end indicator.

A subframe 4 is used as an example, and a DAI end indicator has two bits, that is, X=4. Values of DAI end indicators corresponding to the last one, last but one, and last but two subframes are respectively A3=4, A2=3, and A1=2, and values of DAI end indicators corresponding to the other two subframes are both A0=1.

For another example, if only two subframes are scheduled in a subframe 8, values of DAI end indicators corresponding to the last one and last but one subframes are respectively A3=4 and A2=3. Optionally, the DAI end indicator may be used to indicate scheduling of the last X-1 PDSCHs in the first instantly scheduled downlink subframe subset, and a method for determining a value of the DAI end indicator is similar to the foregoing method.

After the first sub-codebook and the second sub-codebook are respectively determined according to the foregoing rules for setting the DAI index indicator and the DAI end indicator, the terminal 202 cascades the two sub-codebooks, for example, arranges the first sub-codebook before the second sub-codebook, or arranges the second sub-codebook before the first sub-codebook, to form the final HARQ-ACK codebook.

For another example, for the optional implementation 8, DAI end indicators are set to 4, 3, 2, 1, 4, 3, 2, 1, . . . according to a reverse sequence of the setting sequence.

Figures 8, 9:
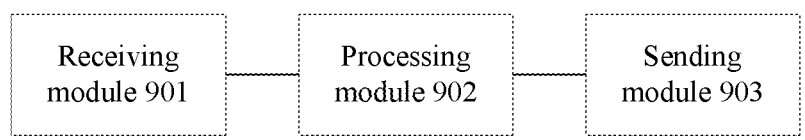
FIG. 8 is a schematic diagram of a case in which a terminal cannot determine how to fill in a NACK according to an embodiment of the present invention.
FIG. 9 is a schematic structural diagram of a terminal according to Embodiment 4 of the present invention.

It should be noted that, in the foregoing sub-codebook cascading solution of forming the final HARQ-ACK codebook by using the plurality of sub-codebooks, a more robust effect is achieved, where the effect is that the terminal 202 and the access network device 201 have consistent understanding of the final codebook. Specific descriptions are as follows:

As shown in FIG. 8, CA of twelve FDD carriers is used as an example. It is assumed that each downlink subframe on carriers 1, 3, 5, 7, 9, and 11 corresponds to one HARQ-ACK bit, and each downlink subframe on carriers 2, 4, 6, 8, 10, and 12 corresponds to two HARQ-ACK bits. Therefore, based on the foregoing method, six downlink subframes on the carriers 1, 3, 5, 7, 9, and 11 form the foregoing first set of preconfigured downlink subframes, and six downlink subframes on the carriers 2, 4, 6, 8, 10, and 12 form the foregoing second set of preconfigured downlink subframes.

It is further assumed that the first instantly scheduled downlink subframe subset in which the access network device 201 actually schedules the terminal 202 includes downlink subframes 1, 5, 7, and 9 in the first set of preconfigured downlink subframes, and the second instantly scheduled downlink subframe subset includes downlink subframes 2, 4, 6, and 8 in the second set of preconfigured downlink subframes. Therefore, values of the first indication information are respectively 1, 2, 3, and 4 for the downlink subframes 1, 5, 7, and 9 in the first subset of preconfigured downlink subframes, and are respectively 1, 2, 3, and 4 for the downlink subframes 2, 4, 6, and 8 in the second subset of preconfigured downlink subframes.

It is further assumed that the terminal 202 does not detect downlink scheduling information in the downlink subframe 5 in the first instantly scheduled downlink subframe subset.

Based on the foregoing assumptions, if the final HARQ-ACK codebook is not formed in the sub-codebook cascading manner, but sub-codebooks are combined in ascending order of carrier indexes or the like, there may still be relatively low probability that the terminal 202 and the access network device 201 have inconsistent understanding of a HARQ-ACK bit sequence in the final codebook. Certainly, such low probability of inconsistent understanding may be resolved by means of higher layer retransmission.

For the foregoing assumptions, the terminal 202 may determine that one piece of downlink scheduling information at a location between locations at which values of first indication information are 1 and 3 in the first instantly scheduled downlink subframe subset is undetected, but the terminal 202 cannot determine whether the undetected downlink scheduling information is corresponding to the carrier 3 or the carrier 5. Therefore, when the terminal 202 combines sub-codebooks in ascending order of carrier index numbers, there are two possibilities. A first possibility is that a corresponding HARQ-ACK bit sequence in a codebook obtained after the combination is corresponding to {1, 22, 3, 44, 66, 7, 88, 9}, and a second possibility is that downlink subframes corresponding to a corresponding HARQ-ACK bit sequence in a codebook obtained after the combination are {1, 22, 44, 5, 66, 7, 88, 9}. 1 represents one HARQ-ACK bit of the carrier 1, 22 represents two HARQ-ACK bits on the carrier 2, and so on.

Therefore, the access network device 201 and the terminal 202 may have inconsistent understanding of the final codebook, but for the foregoing situation, the access network device 201 may also learn, in advance, an undetected subframe that the terminal 202 may be uncertain of, so that the access network device 201 can at least accurately obtain a HARQ-ACK bit at another location in the HARQ-ACK codebook, and physical layer retransmission is not started in downlink subframes corresponding to all HARQ-ACK bits in the HARQ-ACK codebook. Alternatively, the access network device 201 may choose to avoid such a scheduling manner, for example, the access network device 201 performs continuous downlink subframe scheduling according to the setting sequence as far as possible.

However, if the manner of directly cascading the sub-codebooks based on the groups is used, a problem that the terminal 202 and the access network device 201 have inconsistent understanding of the final HARQ-ACK codebook can be resolved. Specifically, the foregoing assumptions are still used as examples. A cascading manner of arranging a sub-codebook in which each subframe corresponds to one HARQ-ACK bit before a sub-codebook in which each subframe corresponds to two HARQ-ACK bits is used, and a final HARQ-ACK codebook obtained after cascading is {1, X, 7, 9, 22, 44, 66, 88}, where X is 3 or 5. The access network device 201 knows that the access network device 201 actually schedules the terminal 202 in which one of a subframe 3 or a subframe 5, and therefore, even if the terminal 202 cannot determine whether the HARQ-ACK codebook is corresponding to the subframe 3 or the subframe 5, the access network device 201 can determine whether the HARQ-ACK codebook is corresponding to the subframe 3 or the subframe 5.

It should be noted that TDD LTE is used as an example for description above, but this embodiment of the present invention is also applicable to another wireless communications system such as FDD LTE. For FDD LTE, in a set M of preconfigured downlink subframes associated with an uplink subframe, there is only one downlink subframe on a downlink carrier. Therefore, an implementation solution of the FDD LTE system in this embodiment of the present invention may be considered as a special case of an implementation solution of the TDD LTE system.

In addition, this embodiment of the present invention is also applicable to the foregoing CA mode of FDD+TDD CA. In this CA mode, in a set M of preconfigured downlink subframes associated with an uplink subframe, there is only one downlink subframe on an FDD carrier, and there may be a plurality of downlink subframes on a TDD carrier according to the foregoing HARQ-ACK time sequence.

EMBODIMENT 4

FIG. 9 is a schematic structural diagram of a terminal according to Embodiment 4 of the present invention. As shown in FIG. 9, the terminal includes a receiving module 901, a processing module 902, and a sending module 903.

The receiving module 901 is configured to receive downlink scheduling information of a downlink subframe $F(i, j)$, and the downlink subframe $F(i, j)$ is a subframe in a set M of preconfigured downlink subframes corresponding to an uplink subframe.

$F(i, j)$ represents a downlink subframe j on a carrier i configured for the terminal, $i \in C$, C is a set of all carriers configured for the terminal for downlink data transmission, $j \in K$, and K is a set of downlink subframes corresponding to the uplink subframe.

The set M of preconfigured downlink subframes is divided into N subsets of preconfigured downlink subframes, N is an integer greater than or equal to 2, a bit quantity of a hybrid automatic repeat request-acknowledgement HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different.

The receiving module 901 is further configured to receive, in the downlink subframe F(i, j), downlink data scheduled by the downlink scheduling information.

The processing module 902 is configured to: generate a HARQ-ACK codebook according to a receiving status of the downlink data received by the receiving module 901 in the downlink subframe F(i, j) and a bit quantity of a HARQ-ACK that needs to be fed back for the downlink subframe F(i, j), where the HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including the downlink subframe in which the terminal receives the downlink data scheduled by the downlink scheduling information; and generate uplink control information by encoding the HARQ-ACK codebook.

The sending module 903 is configured to send the uplink control information in the uplink subframe.

Optionally, a HARQ-ACK included in the sub-codebook is a HARQ-ACK for a scheduled downlink subframe in a subset of preconfigured downlink subframes corresponding to the sub-codebook, but does not include a HARQ-ACK for an unscheduled downlink subframe in the subset of preconfigured downlink subframes corresponding to the sub-codebook.

Optionally, a HARQ-ACK included in the sub-codebook includes a HARQ-ACK for a scheduled downlink subframe in a subset of preconfigured downlink subframes corresponding to the sub-codebook; or a HARQ-ACK included in the sub-codebook includes at least one filled-in bit and a HARQ-ACK for a scheduled downlink subframe in a subset of preconfigured downlink subframes corresponding to the sub-codebook, and the filled-in bit may be a preset value such as a NACK. It should be noted that regardless of whether the filled-in NACK is included, a bit quantity of the sub-codebook needs to be less than a bit quantity of a HARQ-ACK corresponding to a subset of preconfigured downlink subframes to which an instantly scheduled downlink subframe subset belongs. The filled-in bit may be located after a bit location of a HARQ-ACK corresponding to a downlink subframe in the instantly scheduled downlink subframe subset.

Optionally, the receiving module 901 is further configured to: before the processing module 902 generates the HARQ-ACK codebook, receive first indication information corresponding to a downlink subframe F(i, j) included in each of the at least one subset of preconfigured downlink subframes. The first indication information is used to indicate a sequence number, according to a setting sequence, of the downlink subframe F(i, j) in scheduled downlink subframes in the subset of preconfigured downlink subframes including the downlink subframe F(i, j).

The processing module 902 is specifically configured to generate the at least one sub-codebook in the following manner:

generating, for one of the at least one subset of preconfigured downlink subframes according to the sequence number indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, the receiving module 901 is further configured to: before the processing module 902 generates the HARQ-ACK codebook, receive second indication information corresponding to each of the at least one subset of preconfigured downlink subframes. For content that the second indication information is used to indicate, refer to descriptions in the foregoing embodiments.

Optionally, the second indication information is used to indicate a bit quantity of a sub-codebook corresponding to the subset of preconfigured downlink subframes including the downlink subframe F(i, j), and the bit quantity may also be referred to as a codebook size. The codebook size is less than a bit quantity of a HARQ-ACK corresponding to the subset of preconfigured downlink subframes but is greater than or equal to a quantity of downlink subframes in the instantly scheduled downlink subframe subset or a quantity of transport blocks. When the codebook size is greater than the quantity of downlink subframes in the instantly scheduled downlink subframe subset or the quantity of transport blocks, both UE and a base station determine that at least one NACK is filled in at the end of the codebook, and a specific quantity of filled-in NACKs is the codebook size minus a quantity of downlink subframes that are in the instantly scheduled downlink subframe subset and in which downlink data is actually scheduled or the quantity of transport blocks. For specific descriptions of this embodiment, refer to Embodiment 3. Details are not described herein again.

The processing module 902 is specifically configured to:

generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, the receiving module 901 is further configured to: before the processing module 902 generates the HARQ-ACK codebook, receive second indication information corresponding to a downlink subframe F(i, j) included in each of the at least one subset of preconfigured downlink subframes.

In the subset of preconfigured downlink subframes including the downlink subframe F(i, j), values of the second indication information corresponding to the last one, last but one, . . . , last but X−2, and last but X−1 of scheduled downlink subframes sorted according to the setting sequence are respectively $A_{X-1}, A_{X-2}, \ldots, A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes including the downlink subframe F(i, j), and $A_{X-1}, A_{X-2}, \ldots, A_1$, and $A_0$ are different values.

Alternatively, in the subset of preconfigured downlink subframes including the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$.

Alternatively, in the subset of preconfigured downlink subframes including the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes including the downlink subframe F(i, j), and $A_{X-1}$, $A_{X-2}, \ldots, A_1$, and $A_0$ are different values.

Alternatively, values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$.

X is a positive integer greater than 1.

The processing module 902 is specifically configured to:

generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, for the setting sequence, refer to the foregoing descriptions.

Optionally, the at least one sub-codebook is cascaded in the HARQ-ACK codebook.

For an optional implementation solution of division of the set M of preconfigured downlink subframes, refer to related descriptions in Embodiment 1.

For an optional implementation in which the processing module 902 generates sub-codebooks, forms the HARQ-ACK codebook by using the generated sub-codebooks, and generates the uplink control information by performing channel encoding, and the sending module 903 sends the uplink control information, refer to processing performed by the terminal 202 in Embodiment 1 to Embodiment 3.

For an optional implementation in which the receiving module 901 receives the first indication information and the second indication information and the processing module 902 determines, according to the first indication information and the second indication information, a downlink subframe scheduled by an access network device, refer to processing performed by the terminal 202 in Embodiment 1 to Embodiment 3.

For another optional implementation of the terminal provided in Embodiment 4, refer to the foregoing terminal 202. A repeated part is not described herein.

Specifically, the processing module 902 is configured to perform a processing operation performed by the terminal 202, the receiving module 901 may be configured to perform a receiving operation performed by the terminal 202, and the sending module 903 may be configured to perform a sending operation performed by the terminal 202.

Figure 10:
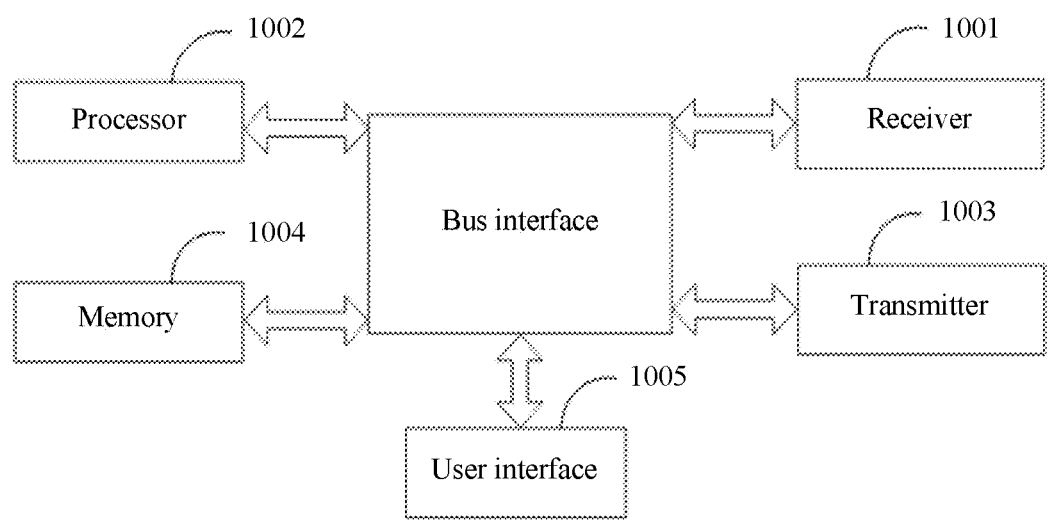
FIG. 10 is a schematic structural diagram of an optional implementation of a terminal according to Embodiment 4 of the present invention.

FIG. 10 shows an optional implementation of the terminal. The processing module 902 may be implemented by a processor 1002 in FIG. 10, the receiving module 901 may be implemented by a receiver 1001 in FIG. 10, and the sending module 903 may be implemented by a transmitter 1003 in FIG. 10. A bus architecture may include any quantity of interconnected buses and bridges, and specifically link various circuits of one or more processors represented by the processor 1002 and one or more memories represented by a memory 1004. The bus architecture may further link various other circuits such as a peripheral device, a voltage regulator, and a power management circuit, which is well known in the art, and therefore no further description is provided in this specification. A bus interface provides an interface. The receiver 1001 and the transmitter 1003 may be implemented by a transceiver that provides units for communicating with various other apparatuses on a transmission medium. For different terminals, a user interface 1005 may further be an interface that can be externally or internally connected to a device, and the connected device includes but is not limited to a keypad, a display, a loudspeaker, a microphone, a joystick, or the like.

Figure 11:
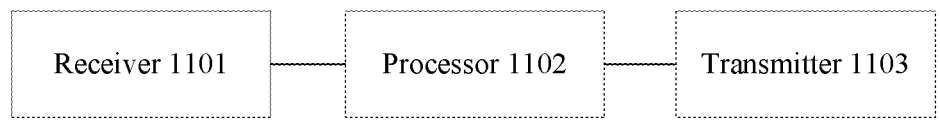
FIG. 11 is a schematic structural diagram of another optional implementation of a terminal according to Embodiment 4 of the present invention.

FIG. 11 shows another optional implementation of the terminal. The processing module 902 may be implemented by a processor 1102 in FIG. 11, the receiving module 901 may be implemented by a receiver 1101 in FIG. 11, and the sending module 903 may be implemented by a transmitter 1103 in FIG. 11.

EMBODIMENT 5

Figure 12:
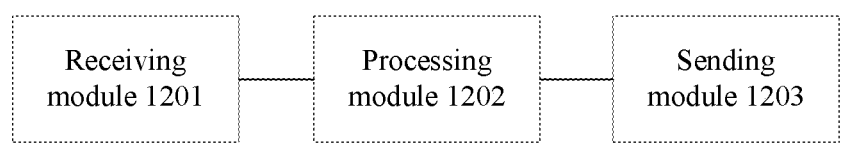
FIG. 12 is a schematic structural diagram of an access network device according to Embodiment 5 of the present invention.

FIG. 12 is a schematic structural diagram of an access network device according to Embodiment 5 of the present invention. As shown in FIG. 12, the access network device includes a sending module 1203, a receiving module 1201, and a processing module 1202.

The sending module 1203 is configured to: send downlink scheduling information of a downlink subframe F(i, j) to a terminal, and send, to the terminal in the downlink subframe F(i, j), downlink data scheduled by the downlink scheduling information. The downlink subframe F(i, j) is a subframe in a set M of preconfigured downlink subframes corresponding to an uplink subframe.

F(i, j) represents a downlink subframe j on a carrier i configured for the terminal, i∈C, C is a set of all carriers configured for the terminal for downlink data transmission, j∈K, and K is a set of downlink subframes corresponding to the uplink subframe.

The set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of hybrid automatic repeat request-acknowledgements HARQ-ACKs that need to be fed back for any downlink subframes in different subsets of preconfigured downlink subframes are different.

The receiving module 1201 is configured to receive uplink control information that is sent by the terminal in the uplink subframe and that is used for feeding back a receiving status of the downlink data scheduled by the downlink scheduling information.

The processing module 1202 is configured to obtain a HARQ-ACK codebook by decoding the uplink control information. The obtained HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes on which the downlink data is scheduled by the downlink scheduling information.

Optionally, a HARQ-ACK included in the sub-codebook is a HARQ-ACK for a scheduled downlink subframe in a subset of preconfigured downlink subframes corresponding to the sub-codebook, but does not include a HARQ-ACK for an unscheduled downlink subframe in the subset of preconfigured downlink subframes corresponding to the sub-codebook.

Optionally, a HARQ-ACK included in the sub-codebook includes a HARQ-ACK for a scheduled downlink subframe in a subset of preconfigured downlink subframes corresponding to the sub-codebook; or a HARQ-ACK included in the sub-codebook includes at least one filled-in bit and a HARQ-ACK for a scheduled downlink subframe in a subset of preconfigured downlink subframes corresponding to the sub-codebook, and the filled-in bit may be a preset value such as a NACK. It should be noted that regardless of whether the filled-in NACK is included, a bit quantity of the sub-codebook needs to be less than a bit quantity of a HARQ-ACK corresponding to a subset of preconfigured downlink subframes to which an instantly scheduled downlink subframe subset belongs. The filled-in bit may be located after a bit location of a HARQ-ACK corresponding to a downlink subframe in the instantly scheduled downlink subframe subset.

Optionally, the sending module 1203 is further configured to: before the receiving module 1201 receives the uplink control information sent by the terminal, send, for a downlink subframe F(i, j) included in each of the at least one subset of preconfigured downlink subframes, first indication information corresponding to the downlink subframe F(i, j) to the terminal, where the first indication information is used to indicate a sequence number, according to a setting sequence, of the downlink subframe F(i, j) in scheduled downlink subframes in the subset of preconfigured downlink subframes including the downlink subframe F(i, j); and instruct the terminal to generate the at least one sub-codebook in the following manner:

generating, for one of the at least one subset of preconfigured downlink subframes according to the sequence number indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, the sending module 1203 is further configured to: before the processing module 1201 receives the uplink control information sent by the terminal, receive second indication information to the terminal for each of the at least one subset of preconfigured downlink subframes. For content that the second indication information is used to indicate, refer to descriptions in the foregoing embodiments.

Optionally, the second indication information is used to indicate a bit quantity of a sub-codebook corresponding to the subset of preconfigured downlink subframes including the downlink subframe F(i, j), and the bit quantity may also be referred to as a codebook size. The codebook size is less than a bit quantity of a HARQ-ACK corresponding to the subset of preconfigured downlink subframes but is greater than or equal to a quantity of downlink subframes in the instantly scheduled downlink subframe subset or a quantity of transport blocks. When the codebook size is greater than the quantity of downlink subframes in the instantly scheduled downlink subframe subset or the quantity of transport blocks, both UE and a base station determine that at least one NACK is filled in at the end of the codebook, and a specific quantity of filled-in NACKs is the codebook size minus a quantity of downlink subframes that are in the instantly scheduled downlink subframe subset and in which downlink data is actually scheduled or the quantity of transport blocks. For specific descriptions of this embodiment, refer to Embodiment 3. Details are not described herein again.

Alternatively, the second indication information may be used to instruct the terminal to:

generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, the sending module 1203 is further configured to: before the receiving module 1201 receives the uplink control information sent by the terminal, send, for a downlink subframe F(i, j) included in each of the at least one subset of preconfigured downlink subframes, second indication information corresponding to the downlink subframe F(i, j) to the terminal.

In the subset of preconfigured downlink subframes including the downlink subframe F(i, j), values of the second indication information corresponding to the last one, last but one, . . . , last but X−2, and last but X−1 of scheduled downlink subframes sorted according to the setting sequence are respectively $A_{X-1}, A_{X-2}, \ldots A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes including the downlink subframe F(i, j), and $A_{X-1}, A_{X-2}, \ldots, A_1$, and $A_0$ are different values.

Alternatively, in the subset of preconfigured downlink subframes including the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$.

Alternatively, in the subset of preconfigured downlink subframes including the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes including the downlink subframe F(i, j), and $A_{X-1}, A_{X-2}, \ldots, A_1$, and $A_0$ are different values.

Alternatively, values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$.

X is a positive integer greater than 1.

The second indication information is used to instruct the terminal to generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, the setting sequence includes:

a sequence between a carrier and a subframe, a carrier sequence, and a subframe sequence.

The sequence between a carrier and a subframe includes: carriers before subframes, or subframes before carriers.

The carrier sequence includes: ascending order of carrier indexes, or descending order of carrier indexes.

The subframe sequence includes: ascending order of subframe moments, or descending order of subframe moments.

Optionally, the at least one sub-codebook is cascaded in the HARQ-ACK codebook.

For an optional implementation solution of division of the set M of preconfigured downlink subframes, refer to related descriptions in Embodiment 1.

For how the processing module 1202 generates the HARQ-ACK codebook by performing channel decoding on the received uplink control information, obtains each sub-codebook, and determines the downlink data receiving status of the terminal according to the HARQ-ACK codebook, refer to processing performed by the access network device 201 in Embodiment 1 to Embodiment 3.

For how the sending module 1203 sends the first indication information and the second indication information, refer to processing performed by the access network device 201 in Embodiment 1 to Embodiment 3.

For another optional implementation of the access network device provided in Embodiment 5, refer to the foregoing access network device 201. A repeated part is not described herein.

Specifically, the processing module 1202 is configured to perform a processing operation performed by the access network device 201, the receiving module 1201 may be configured to perform a receiving operation performed by the access network device 201, and the sending module 1203 may be configured to perform a sending operation performed by the access network device 201.

Figure 13:
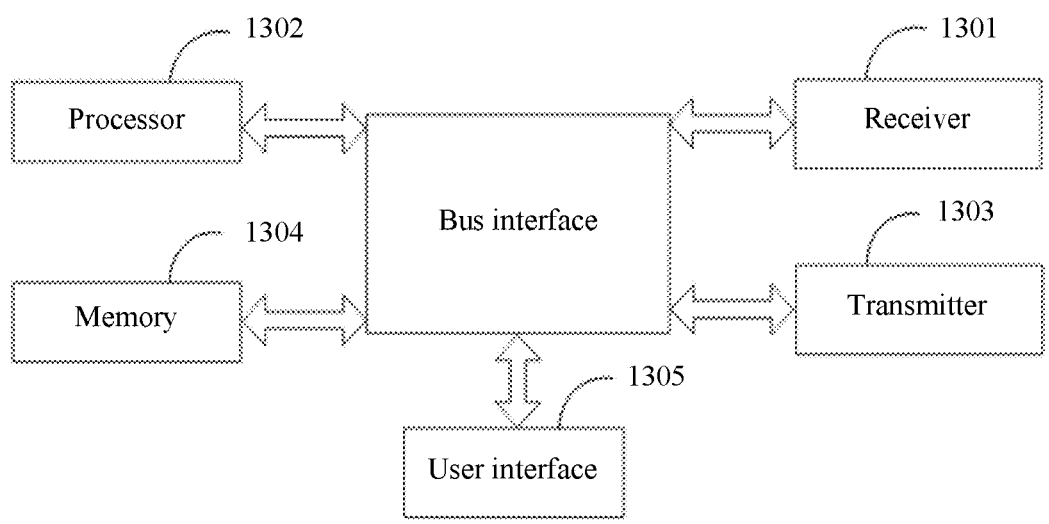
FIG. 13 is a schematic structural diagram of an optional implementation of an access network device according to Embodiment 5 of the present invention.

FIG. 13 shows an optional implementation of the access network device. The processing module 1202 may be implemented by a processor 1302 in FIG. 13, the receiving module 1201 may be implemented by a receiver 1301 in FIG. 13, and the sending module 1203 may be implemented by a transmitter 1303 in FIG. 13. A bus architecture may include any quantity of interconnected buses and bridges, and specifically link various circuits of one or more processors represented by the processor 1302 and one or more memories represented by a memory 1304. The bus architecture may further link various other circuits such as a peripheral device, a voltage regulator, and a power management circuit, which is well known in the art, and therefore no further description is provided in this specification. A bus interface provides an interface. The receiver 1301 and the transmitter 1303 may be implemented by a transceiver that provides units for communicating with various other apparatuses on a transmission medium.

Figure 14:
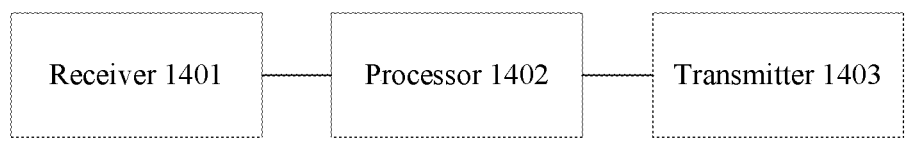
FIG. 14 is a schematic structural diagram of another optional implementation of an access network device according to Embodiment 5 of the present invention.

FIG. 14 shows another optional implementation of the access network device. The processing module 1202 may be implemented by a processor 1402 in FIG. 14, the receiving module 1201 may be implemented by a receiver 1401 in FIG. 14, and the sending module 1203 may be implemented by a transmitter 1403 in FIG. 14.

EMBODIMENT 6

Figure 15:
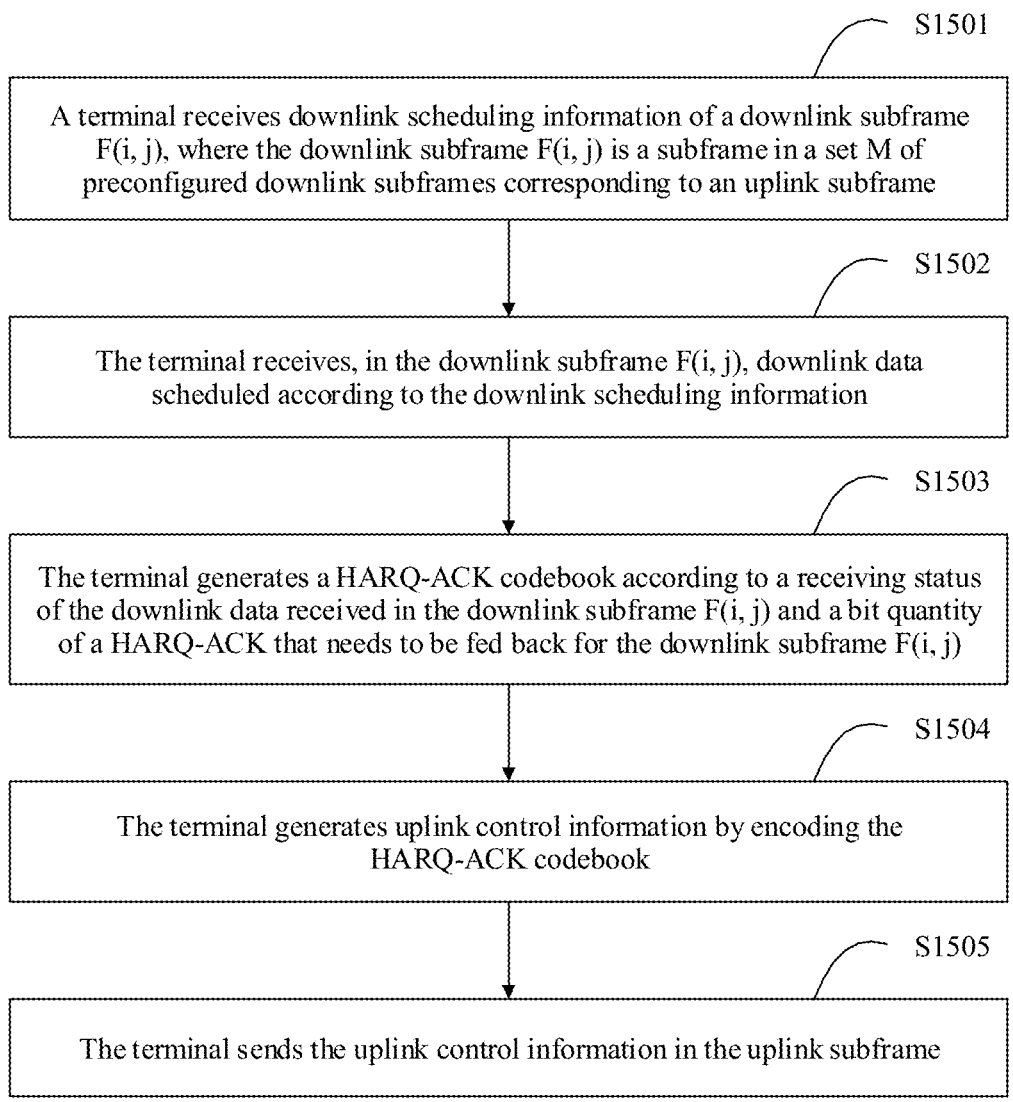
FIG. 15 is a flowchart of an uplink control information sending method according to an embodiment of the present invention.

FIG. 15 is a flowchart of an uplink control information sending method according to Embodiment 6 of the present invention. As shown in FIG. 15, the method includes the following steps.

S1501. A terminal receives downlink scheduling information of a downlink subframe F(i, j), where the downlink subframe F(i, j) is a subframe in a set M of preconfigured downlink subframes corresponding to an uplink subframe.

F(i, j) represents a downlink subframe j on a carrier i configured for the terminal, i∈C, C is a set of all carriers configured for the terminal for downlink data transmission, j∈K, and K is a set of downlink subframes corresponding to the uplink subframe.

The set M of preconfigured downlink subframes is divided into N subsets of preconfigured downlink subframes, N is an integer greater than or equal to 2, a bit quantity of a hybrid automatic repeat request-acknowledgement HARQ-ACK that needs to be fed back for each downlink subframe in one subset of preconfigured downlink subframes is a predetermined value, and bit quantities of HARQ-ACKs that need to be fed back for any downlink subframes in different subsets of preconfigured downlink subframes are different.

S1502. The terminal receives, in the downlink subframe F(i, j), downlink data scheduled by the downlink scheduling information.

S1503. The terminal generates a HARQ-ACK codebook according to a receiving status of the downlink data received in the downlink subframe F(i, j) and a bit quantity of a HARQ-ACK that needs to be fed back for the downlink subframe F(i, j), where the HARQ-ACK codebook includes at least one sub-codebook, the at least one sub-codebook is in one-to-one correspondence with at least one subset of preconfigured downlink subframes, the at least one subset of preconfigured downlink subframes is at least one of N subsets of preconfigured downlink subframes, and the at least one subset of preconfigured downlink subframes is a subset including the downlink subframe in which the terminal receives the downlink data scheduled by the downlink scheduling information.

S1504. The terminal generates uplink control information by encoding the HARQ-ACK codebook.

S1505. The terminal sends the uplink control information in the uplink subframe.

Optionally, a HARQ-ACK included in the sub-codebook is a HARQ-ACK for a scheduled downlink subframe in a subset of preconfigured downlink subframes corresponding to the sub-codebook, but does not include a HARQ-ACK for an unscheduled downlink subframe in the subset of preconfigured downlink subframes corresponding to the sub-codebook.

Optionally, a HARQ-ACK included in the sub-codebook includes a HARQ-ACK for a scheduled downlink subframe in a subset of preconfigured downlink subframes corresponding to the sub-codebook; or a HARQ-ACK included in the sub-codebook includes at least one filled-in bit and a HARQ-ACK for a scheduled downlink subframe in a subset of preconfigured downlink subframes corresponding to the sub-codebook, and the filled-in bit may be a preset value such as a NACK. It should be noted that regardless of whether the filled-in NACK is included, a bit quantity of the sub-codebook needs to be less than a bit quantity of a HARQ-ACK corresponding to a subset of preconfigured downlink subframes to which an instantly scheduled downlink subframe subset belongs. The filled-in bit may be located after a bit location of a HARQ-ACK corresponding to a downlink subframe in the instantly scheduled downlink subframe subset.

Optionally, before the generating a HARQ-ACK codebook, the method further includes:

receiving first indication information corresponding to a downlink subframe $F(i, j)$ included in each of the at least one subset of preconfigured downlink subframes, where the first indication information is used to indicate a sequence number, according to a setting sequence, of the downlink subframe $F(i, j)$ in scheduled downlink subframes in the subset of preconfigured downlink subframes including the downlink subframe $F(i, j)$.

The at least one sub-codebook is generated in the following manner:

generating, by the terminal for one of the at least one subset of preconfigured downlink subframes according to the sequence number indicated by the first indication information and according to the receiving status of the downlink data received in the downlink subframe $F(i, j)$ and the bit quantity of the HARQ-ACK that needs to be fed back for the downlink subframe $F(i, j)$, a sub-codebook corresponding to the one subset of preconfigured downlink subframes.

Optionally, before the generating a HARQ-ACK codebook, the method further includes:

receiving second indication information corresponding to each of the at least one subset of preconfigured downlink subframes. For content indicated by the second indication information, refer to descriptions in the foregoing embodiments.

Optionally, the second indication information is used to indicate a bit quantity of a sub-codebook corresponding to the subset of preconfigured downlink subframes including the downlink subframe $F(i, j)$, and the bit quantity may also be referred to as a codebook size. The codebook size is less than a bit quantity of a HARQ-ACK corresponding to the subset of preconfigured downlink subframes but is greater than or equal to a quantity of downlink subframes in the instantly scheduled downlink subframe subset or a quantity of transport blocks. When the codebook size is greater than the quantity of downlink subframes in the instantly scheduled downlink subframe subset or the quantity of transport blocks, both UE and a base station determine that at least one NACK is filled in at the end of the codebook, and a specific quantity of filled-in NACKs is the codebook size minus a quantity of downlink subframes that are in the instantly scheduled downlink subframe subset and in which downlink data is actually scheduled or the quantity of transport blocks. For specific descriptions of this embodiment, refer to Embodiment 3. Details are not described herein again.

The generating, by the terminal according to the sequence number indicated by the first indication information and according to the receiving status of the downlink data received in the downlink subframe $F(i, j)$ and the bit quantity of the HARQ-ACK that needs to be fed back for the downlink subframe $F(i, j)$, a sub-codebook corresponding to the any subset of preconfigured downlink subframes includes:

generating, by the terminal for one of the at least one subset of preconfigured downlink subframes according to the second indication information and the sequence number that is indicated by the first indication information and according to the receiving status of the downlink data received in the downlink subframe $F(i, j)$ and the bit quantity of the HARQ-ACK that needs to be fed back for the downlink subframe $F(i, j)$, a sub-codebook corresponding to the one subset of preconfigured downlink subframes.

Optionally, before the generating a HARQ-ACK codebook, the method further includes:

receiving second indication information corresponding to a downlink subframe $F(i, j)$ included in each of the at least one subset of preconfigured downlink subframes.

In the subset of preconfigured downlink subframes including the downlink subframe $F(i, j)$, values of the second indication information corresponding to the last one, last but one, . . . , last but X–2, and last but X–1 of scheduled downlink subframes sorted according to the setting sequence are respectively $A_{X-1}, A_{X-2}, \ldots, A_1$, and $A_0$, values of the second indication information corresponding to other downlink subframes are respectively $A_0$, the other downlink subframes are downlink subframes, other than the last one, last but one, . . . , last but X–2, and last but X–1 of the sorted scheduled downlink subframes, in the subset of preconfigured downlink subframes including the downlink subframe $F(i, j)$, and $A_{X-1}, A_{X-2}, \ldots, A_1$, and $A_0$ are different values.

Alternatively, in the subset of preconfigured downlink subframes including the downlink subframe $F(i, j)$, values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$.

Alternatively, in the subset of preconfigured downlink subframes including the downlink subframe $F(i, j)$, values of the second indication information corresponding to the last one, last but one, . . . , last but X–2, and last but X–1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X–2, and last but X–1 of the sorted scheduled downlink subframes whose subframe numbers are j, in the subset of preconfigured downlink subframes including the downlink subframe $F(i, j)$, and $A_{X-1}, A_{X-2}, \ldots, A_1$, and $A_0$ are different values.

Alternatively, values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$.

X is a positive integer greater than 1.

The generating, by the terminal according to the sequence number indicated by the first indication information and according to the receiving status of the downlink data received in the downlink subframe $F(i, j)$ and the bit quantity of the HARQ-ACK that needs to be fed back for the downlink subframe $F(i, j)$, a sub-codebook corresponding to the any subset of preconfigured downlink subframes includes:

generating, by the terminal for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, for the setting sequence, refer to the foregoing descriptions.

Optionally, the at least one sub-codebook is cascaded in the HARQ-ACK codebook.

For an optional implementation solution of division of the set M of preconfigured downlink subframes, refer to related descriptions in Embodiment 1.

For an optional implementation in which the terminal generates sub-codebooks, forms the HARQ-ACK codebook by using the generated sub-codebooks, generates the uplink control information by performing channel encoding, and sends the uplink control information, refer to processing performed by the terminal 202 in Embodiment 1 to Embodiment 3.

For an optional implementation in which the terminal receives the first indication information and the second indication information and determines, according to the first indication information and the second indication information, a downlink subframe scheduled by an access network device, refer to processing performed by the terminal 202 in Embodiment 1 to Embodiment 3.

For another optional implementation of the uplink control information sending method provided in Embodiment 6, refer to the foregoing terminal 202. A repeated part is not described herein.

EMBODIMENT 7

Figure 16:
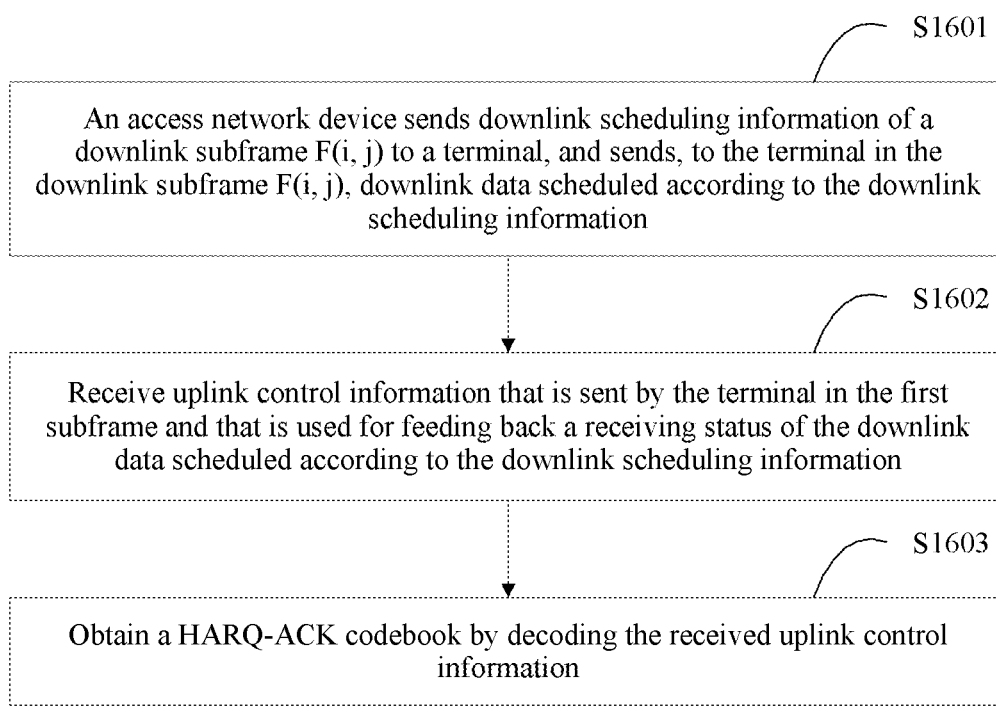
FIG. 16 is a flowchart of an uplink control information receiving method according to an embodiment of the present invention.

FIG. 16 is a flowchart of an uplink control information receiving method according to Embodiment 7 of the present invention. As shown in FIG. 16, the method includes the following steps.

S1601. An access network device sends downlink scheduling information of a downlink subframe F(i, j) to a terminal, and sends, to the terminal in the downlink subframe F(i, j), downlink data scheduled by the downlink scheduling information, where the downlink subframe F(i, j) is a subframe in a set M of preconfigured downlink subframes corresponding to an uplink subframe.

F(i, j) represents a downlink subframe j on a carrier i configured for the terminal, i∈C, C is a set of all carriers configured for the terminal for downlink data transmission, j∈K, and K is a set of downlink subframes corresponding to the uplink subframe.

The set M of preconfigured downlink subframes is divided into N subsets of preconfigured downlink subframes, N is an integer greater than or equal to 2, a bit quantity of a HARQ-ACK that needs to be fed back for each downlink subframe in one subset of preconfigured downlink subframes is a predetermined value, and bit quantities of hybrid automatic repeat request-acknowledgements HARQ-ACKs that need to be fed back for any downlink subframes in different subsets of preconfigured downlink subframes are different.

S1602. Receive uplink control information that is sent by the terminal in the uplink subframe and that is used for feeding back a receiving status of the downlink data scheduled by the downlink scheduling information.

S1603. Obtain a HARQ-ACK codebook by decoding the received uplink control information, where the obtained HARQ-ACK codebook includes at least one sub-codebook, the at least one sub-codebook is in one-to-one correspondence with at least one subset of preconfigured downlink subframes, the at least one subset of preconfigured downlink subframes is at least one of the N subsets of preconfigured downlink subframes, and the at least one subset of preconfigured downlink subframes is a subset including downlink subframes in which the downlink data scheduled by the downlink scheduling information is sent.

Optionally, a HARQ-ACK included in the sub-codebook is a HARQ-ACK for a scheduled downlink subframe in a subset of preconfigured downlink subframes corresponding to the sub-codebook, but does not include a HARQ-ACK for an unscheduled downlink subframe in the subset of preconfigured downlink subframes corresponding to the sub-codebook.

Optionally, a HARQ-ACK included in the sub-codebook includes a HARQ-ACK for a scheduled downlink subframe in a subset of preconfigured downlink subframes corresponding to the sub-codebook; or a HARQ-ACK included in the sub-codebook includes at least one filled-in bit and a HARQ-ACK for a scheduled downlink subframe in a subset of preconfigured downlink subframes corresponding to the sub-codebook, and the filled-in bit may be a preset value such as a NACK. It should be noted that regardless of whether the filled-in NACK is included, a bit quantity of the sub-codebook needs to be less than a bit quantity of a HARQ-ACK corresponding to a subset of preconfigured downlink subframes to which an instantly scheduled downlink subframe subset belongs. The filled-in bit may be located after a bit location of a HARQ-ACK corresponding to a downlink subframe in the instantly scheduled downlink subframe subset.

Optionally, before the receiving uplink control information that is sent by the terminal, the method further includes:
    sending, for a downlink subframe F(i, j) included in each of the at least one subset of preconfigured downlink subframes, first indication information corresponding to the downlink subframe F(i, j) to the terminal, where the first indication information is used to indicate a sequence number, according to a setting sequence, of the downlink subframe F(i, j) in scheduled downlink subframes in the subset of preconfigured downlink subframes including the downlink subframe F(i, j); and
    instructing the terminal to generate the at least one sub-codebook in the following manner:
    generating, for one of the at least one subset of preconfigured downlink subframes according to the sequence number indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, before the receiving uplink control information that is sent by the terminal, the method further includes:
    sending second indication information to the terminal for each of the at least one subset of preconfigured downlink subframes, where the second indication information is used to indicate:
    a total quantity of scheduled downlink subframes whose subframe numbers are j and that are in the subset of preconfigured downlink subframes including the downlink subframe F(i, j); or a total quantity of a scheduled downlink subframe whose subframe number is j and a downlink subframe before the downlink subframe whose subframe number is j, where the scheduled downlink subframe whose subframe number is j and the downlink subframe before the downlink subframe whose subframe number is j are in the subset of preconfigured downlink subframes including the downlink subframe F(i, j); or a total quantity of scheduled downlink subframes in the subset of preconfigured downlink subframes including the downlink subframe F(i, j); or a total quantity of transport blocks transmitted in a scheduled downlink subframe that is in the subset of preconfigured downlink subframes including the downlink subframe F(i, j) and whose subframe number is j; or a total quantity of transport blocks transmitted in a scheduled downlink subframe whose subframe number is j and a downlink subframe before the downlink subframe whose subframe number is j, where the scheduled downlink subframe whose subframe number is j and the downlink subframe before the downlink subframe whose subframe number is j are in the subset of preconfigured downlink subframes including the downlink subframe F(i, j); or a total quantity of transport blocks transmitted in a scheduled downlink subframe in the subset of preconfigured downlink subframes including the downlink subframe F(i, j).

Optionally, the second indication information is used to indicate a bit quantity of a sub-codebook corresponding to the subset of preconfigured downlink subframes including the downlink subframe F(i, j), and the bit quantity may also be referred to as a codebook size. The codebook size is less than a bit quantity of a HARQ-ACK corresponding to the subset of preconfigured downlink subframes but is greater than or equal to a quantity of downlink subframes in the instantly scheduled downlink subframe subset or a quantity of transport blocks. When the codebook size is greater than the quantity of downlink subframes in the instantly scheduled downlink subframe subset or the quantity of transport blocks, both UE and a base station determine that at least one NACK is filled in at the end of the codebook, and a specific quantity of filled-in NACKs is the codebook size minus a quantity of downlink subframes that are in the instantly scheduled downlink subframe subset and in which downlink data is actually scheduled or the quantity of transport blocks. For specific descriptions of this embodiment, refer to Embodiment 3. Details are not described herein again.

The terminal is instructed to generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, before the receiving uplink control information that is sent by the terminal, the method further includes: sending, for a downlink subframe F(i, j) included in each of the at least one subset of preconfigured downlink subframes, second indication information corresponding to the downlink subframe F(i, j) to the terminal.

In the subset of preconfigured downlink subframes including the downlink subframe F(i, j), values of the second indication information corresponding to the last one, last but one, . . . , last but X−2, and last but X−1 of scheduled downlink subframes sorted according to the setting sequence are respectively $A_{X-1}, A_{X-2}, \ldots, A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes including the downlink subframe F(i, j), and $A_{X-1}, A_{X-2}, \ldots, A_1$, and $A_0$ are different values.

Alternatively, in the subset of preconfigured downlink subframes including the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$.

Alternatively, in the subset of preconfigured downlink subframes including the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes including the downlink subframe F(i, j), and $A_{X-1}, A_{X-2}, \ldots, A_1$, and $A_0$ are different values.

Alternatively, values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$.

X is a positive integer greater than 1.

The terminal is instructed to generate, for one of the at least one subset of preconfigured downlink subframes according to the second indication information and the sequence number that is indicated by the first indication information and according to the receiving status of the downlink data received in the downlink subframe F(i, j) and the bit quantity of the HARQ-ACK that needs to be fed back for the downlink subframe F(i, j), a sub-codebook corresponding to the one subset of preconfigured downlink subframes.

Optionally, for the setting sequence, refer to the foregoing descriptions.

Optionally, the at least one sub-codebook is cascaded in the HARQ-ACK codebook.

For an optional implementation solution of division of the set M of preconfigured downlink subframes, refer to related descriptions in Embodiment 1.

For how the access network device generates the HARQ-ACK codebook by performing channel decoding on the received uplink control information, obtains each sub-codebook, and determines the downlink data receiving status of the terminal according to the HARQ-ACK codebook, refer to processing performed by the access network device 201 in Embodiment 1 to Embodiment 3.

For how the access network device sends the first indication information and the second indication information, refer to processing performed by the access network device 201 in Embodiment 1 to Embodiment 3.

For another optional implementation of the uplink control information receiving method provided in Embodiment 7, refer to the foregoing access network device 201. A repeated part is not described herein.

In conclusion, in this embodiment of the present invention, the set M of preconfigured downlink subframes is divided into the foregoing N subset of preconfigured downlink subframes, the bit quantity of the HARQ-ACK that needs to be fed back for each downlink subframe in one subset of preconfigured downlink subframes is a predetermined value, and the bit quantities of the HARQ-ACKs that need to be fed back for any downlink subframes in different subsets of preconfigured downlink subframes are different. In this way, when generating an ACK/NACK codebook, the terminal feeds back a HARQ-ACK according to the bit quantity of the HARQ-ACK that needs to be fed back for the downlink subframe in the subset of preconfigured downlink subframes. Therefore, when the access network device parses, after receiving the uplink control information generated according to the HARQ-ACK codebook, the ACK/NACK codebook according to the bit quantity of the HARQ-ACK that needs to be fed back for the downlink subframe in the subset of preconfigured downlink subframes, a HARQ-ACK feedback solution is provided, so that a case in which bit quantities of HARQ-ACKs that need to be fed back for downlink subframes on different to-be-aggregated carriers are different can be supported.

Persons skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may be in a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. In this way, the present invention is intended to cover these modifications and variations provided that they fall within the scope of protection defined by the following claims and their equivalent technologies.

What is claimed is:

1. An apparatus, comprising:
   a storage medium including executable instructions; and
   a processor coupled to the storage medium, the processor executing the instructions to cause the apparatus to:
   send downlink scheduling information of a downlink subframe $F(i, j)$;
   send, in the downlink subframe $F(i, j)$, downlink data scheduled by the downlink scheduling information:
   the downlink subframe $F(i, j)$ representing a downlink subframe j on a carrier i configured for a terminal, the carrier $i \in C$, C being a set of all carriers configured for the terminal for downlink data transmission, the subframe $j \in K$, and K being a set of downlink subframes corresponding to an uplink subframe,
   the downlink subframe $F(i, j)$ belonging to a set M of preconfigured downlink subframes corresponding to the uplink subframe,
   the set M of preconfigured downlink subframes comprising N subsets of preconfigured downlink subframes, N being an integer greater than or equal to 2,
   a bit quantity of a hybrid automatic repeat request-acknowledgement (HARQ-ACK) that needs to be fed back for each downlink subframe in one subset of preconfigured downlink subframes being a predetermined value, and
   bit quantities of HARQ-ACKs that need to be fed back for any downlink subframes in different subsets of preconfigured downlink subframes being different;
   receive, in the uplink subframe, uplink control information of a receiving status of the downlink data; and
   obtain a HARQ-ACK codebook by decoding the uplink control information, the HARQ-ACK codebook comprising at least one sub-codebook, the at least one sub-codebook being in one-to-one correspondence with at least one subset of preconfigured downlink subframes of the N subsets of preconfigured downlink subframes, and the at least one subset including the downlink subframe $F(i, j)$ in which the downlink data scheduled by the downlink scheduling information is sent.

2. The apparatus according to claim 1, wherein the sub-codebook comprises a HARQ-ACK for a scheduled downlink subframe in a subset of preconfigured downlink subframes corresponding to the sub-codebook, but does not comprise a HARQ-ACK for an unscheduled downlink subframe in the subset of preconfigured downlink subframes corresponding to the sub-codebook.

3. The apparatus according to claim 2, wherein the processor further executes the instructions to cause the apparatus to:
send, for the downlink subframe F(i, j) comprised in each subset of the at least one subset of preconfigured downlink subframes, first indication information corresponding to the downlink subframe F(i, j), wherein the first indication information indicates a sequence number of the downlink subframe F(i, j), and the first indication information is sent in a same signaling with the downlink scheduling information;
wherein a sub-codebook corresponding to a subset in the at least one subset of preconfigured downlink subframes is generated according to the sequence numbers indicated by the first indication information, according to the receiving status of the downlink data received in the downlink subframe F(i, j), and according to the bit quantity of the HARQ-ACK that needs to be fed back for the downlink subframe F(i, j).

4. The apparatus according to claim 3, wherein the processor further executes the instructions to cause the apparatus to:
send second indication information that is corresponding to the each subset of the at least one subset of preconfigured downlink subframes and that is used for the terminal to generate the sub-codebook, wherein the second indication information is sent in a same signaling with the first indication information, and the second indication information is used to indicate:
a total quantity of scheduled downlink subframes that are in the subset of preconfigured downlink subframes comprising the downlink subframe F(i, j) and whose subframe numbers are j; or
a total quantity of a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or
a total quantity of scheduled downlink subframes in the subset of preconfigured downlink subframes comprising the downlink subframe F(i, j); or
a total quantity of transport blocks transmitted in a scheduled downlink subframe that is in the subset of preconfigured downlink subframes comprising the downlink subframe F(i, j) and whose subframe number is j; or
a total quantity of transport blocks transmitted in a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or
a total quantity of transport blocks transmitted in a scheduled downlink subframe in the subset of preconfigured downlink subframes comprising the downlink subframe F(i, j).

5. The apparatus according to claim 3, wherein the processor further executes the instructions to cause the apparatus to:
send second indication information that is corresponding to a downlink subframe F(i, j) comprised in the each subset of the at least one subset of preconfigured downlink subframes and that is used for generating the sub-codebook;
wherein in the subset of preconfigured downlink subframes comprising the downlink subframe F(i, j), values of the second indication information corresponding to the last one, last but one, . . . , last but X−2, and last but X−1 of scheduled downlink subframes sorted according to the setting sequence are respectively $A_{X-1}$, $A_{X-2}$, . . . , $A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes comprising the downlink subframe F(i, j), and $A_{X-1}, A_{X-2}, \ldots, A_1$, and $A_0$ are different values; or
in the subset of preconfigured downlink subframes comprising the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$; or
in the subset of preconfigured downlink subframes comprising the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes comprising the downlink subframe F(i, j), and $A_{X-1}$, $A_{X-2}, \ldots, A_1$, and $A_0$ are different values; or
values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$;
wherein X is a positive integer greater than 1.

6. The apparatus according to claim 3, wherein the setting sequence comprises:
a sequence between a carrier and a subframe; wherein:
the sequence between a carrier and a subframe comprises: carriers before subframes;
the carrier sequence comprises: ascending order of carrier indexes; and
the subframe sequence comprises: ascending order of subframe moments.

7. The apparatus according to claim 1, wherein the at least one sub-codebook is cascaded in the HARQ-ACK codebook.

8. The apparatus according to claim 1, wherein in the HARQ-ACK codebook, a sub-codebook corresponding to a subset of preconfigured downlink subframes with a smaller bit quantity of a HARQ-ACK is located before a sub-codebook corresponding to a subset of preconfigured downlink subframes with a larger bit quantity of a HARQ-ACK that needs to be fed back.

9. A method, comprising:
sending downlink scheduling information of a downlink subframe F(i, j);
sending, in the downlink subframe F(i, j), downlink data scheduled by the downlink scheduling information,
the downlink subframe F(i, j) representing a downlink subframe j on a carrier i configured for a terminal, the carrier i∈C, C being a set of all carriers configured for the terminal for downlink data transmission, the subframe j∈K, and K is a set of downlink subframes corresponding to an uplink subframe,
the downlink subframe F(i, j) belonging to a set M of preconfigured downlink subframes corresponding to the uplink subframe,
the set M of preconfigured downlink subframes comprising N subsets of preconfigured downlink subframes, N being an integer greater than or equal to 2,
a bit quantity of a hybrid automatic repeat request-acknowledgement (HARQ-ACK) that needs to be fed back for each downlink subframe in one subset of preconfigured downlink subframes being a predetermined value, and
bit quantities of HARQ-ACKs that need to be fed back for any downlink subframes in different subsets of preconfigured downlink subframes being different;
receiving, in the uplink subframe, uplink control information of a receiving status of the downlink data; and
obtaining a HARQ-ACK codebook by decoding the uplink control information, the HARQ-ACK codebook comprising at least one sub-codebook, the at least one sub-codebook being in one-to-one correspondence with at least one subset of preconfigured downlink subframes of the N subsets of preconfigured downlink subframes, and the at least one subset including the downlink subframe F(i, j) in which the downlink data scheduled by the downlink scheduling information is sent.

10. The method according to claim 9, wherein the sub-codebook comprises a HARQ-ACK for a scheduled downlink subframe in a subset of preconfigured downlink subframes corresponding to the sub-codebook, but does not comprise a HARQ-ACK for an unscheduled downlink subframe in the subset of preconfigured downlink subframes corresponding to the sub-codebook.

11. The method according to claim 10, further comprising:
sending, for the downlink subframe F(i, j) comprised in each subframe of the at least one subset of preconfigured downlink subframes, first indication information corresponding to the downlink subframe F(i, j), wherein the first indication information indicates a sequence number of the downlink subframe F(i, j), and the first indication information is sent in a same signaling with the downlink scheduling information,
wherein a sub-codebook corresponding to a subset in the at least one subset of preconfigured downlink subframes is generated according to the sequence numbers indicated by the first indication information, according to the receiving status of the downlink data received in the downlink subframe F(i, j), and according to the bit quantity of the HARQ-ACK that needs to be fed back for the downlink subframe F(i, j).

12. The method according to claim 11, further comprising:
sending second indication information that is corresponding to the each subset of the at least one subset of preconfigured downlink subframes and that is used for the terminal to generate the sub-codebook, wherein the second indication information is sent in same signaling with the first indication information, and the second indication information is used to indicate:
a total quantity of scheduled downlink subframes that are in the subset of preconfigured downlink subframes comprising the downlink subframe F(i, j) and whose subframe numbers are j; or
a total quantity of a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or
a total quantity of scheduled downlink subframes in the subset of preconfigured downlink subframes comprising the downlink subframe F(i, j); or
a total quantity of transport blocks transmitted in a scheduled downlink subframe that is in the subset of preconfigured downlink subframes comprising the downlink subframe F(i, j) and whose subframe number is j; or
a total quantity of transport blocks transmitted in a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or
a total quantity of transport blocks transmitted in a scheduled downlink subframe in the subset of preconfigured downlink subframes comprising the downlink subframe F(i, j).

13. The method according to claim 11, further comprising:
send second indication information that is corresponding to a downlink subframe F(i, j) comprised in the each subset of the at least one subset of preconfigured downlink subframes and that is used for generating the sub-codebook;
wherein in the subset of preconfigured downlink subframes comprising the downlink subframe F(i, j), values of the second indication information corresponding to the last one, last but one, . . . , last but X−2, and last but X−1 of scheduled downlink subframes sorted according to the setting sequence are respectively $A_{X-1}$, $A_{X-2}$, . . . , $A_1$, and $A_0$, values of the second indication information corresponding to other downlink subframes are respectively $A_0$, the other downlink subframes are downlink subframes, other than the last one, last but one, . . . , last but X−2, and last but X−1 of the sorted scheduled downlink subframes, in the subset of preconfigured downlink subframes comprising the downlink subframe F(i, j), and $A_{X-1}, A_{X-2}, \ldots, A_1$, and $A_0$ are different values; or in the subset of preconfigured downlink subframes comprising the downlink subframe F(i, j), values of the second indication information corresponding to scheduled downlink subframes, sorted according to a reversed sequence of the setting sequence, in the subset of preconfigured downlink subframes are respectively cyclic values of $\{A_{X-1}, A_{X-2}, \ldots, A_1, A_0\}$; or in the subset of preconfigured downlink subframes comprising the downlink subframe F(i, j), values of the second indication information corresponding to the last one, last but one, . . . , last but X−2, and last but X−1 of scheduled downlink subframes that are sorted according to the setting sequence and whose subframe numbers are j are respectively $A_{X-1}, A_{X-2}, \ldots, A_1$, and $A_0$, values of the second indication information corresponding to other downlink subframes whose sequence numbers are j are respectively $A_0$, the other downlink subframes whose sequence numbers are j are downlink subframes, other than the last one, last but one, . . . , last but X−2, and last but X−1 of the sorted scheduled downlink subframes whose subframe numbers are j, in the subset of preconfigured downlink subframes comprising the downlink subframe F(i, j), and $A_{X-1}, A_{X-2}, \ldots, A_1$, and $A_0$ are different values; or values of the second indication information corresponding to scheduled downlink subframes that are sorted according to a reversed sequence of the setting sequence in the subset of preconfigured downlink subframes and whose subframe numbers are j are respectively cyclic values of $\{A_{X-1}, A_{X-2}, \ldots, A_1, A_0\}$;

wherein X is a positive integer greater than 1.

14. The method according to claim 11, wherein the setting sequence comprises:
   a sequence between a carrier and a subframe; wherein the sequence between a carrier and a subframe comprises: carriers before subframes;
   the carrier sequence comprises: ascending order of carrier indexes; and
   the subframe sequence comprises: ascending order of subframe moments.

15. The method according to claim 10, wherein the at least one sub-codebook is cascaded in the HARQ-ACK codebook.

16. The method according to claim 9, wherein in the HARQ-ACK codebook, a sub-codebook corresponding to a subset of preconfigured downlink subframes with a smaller bit quantity of a HARQ-ACK is located before a sub-codebook corresponding to a subset of preconfigured downlink subframes with a larger bit quantity of a HARQ-ACK that needs to be fed back.

17. A non-transitory computer-readable storage medium comprising instructions which, when executed by a computer, cause the computer to carry out the steps of:
   sending downlink scheduling information of a downlink subframe F(i, j);
   sending, in the downlink subframe F(i, j), downlink data scheduled by the downlink scheduling information,
      the downlink subframe F(i, j) representing a downlink subframe j on a carrier i configured for a terminal, the carrier i∈C, C being a set of all carriers configured for the terminal for downlink data transmission, the subframe j∈K, and K being a set of downlink subframes corresponding to an uplink subframe,
      the downlink subframe F(i, j) belonging to a set M of preconfigured downlink subframes corresponding to the uplink subframe,
      the set M of preconfigured downlink subframes comprising N subsets of preconfigured downlink subframes, N being an integer greater than or equal to 2,
      a bit quantity of a hybrid automatic repeat request-acknowledgement (HARQ-ACK) that needs to be fed back for each downlink subframe in one subset of preconfigured downlink subframes being a predetermined value, and
      bit quantities of HARQ-ACKs that need to be fed back for any downlink subframes in different subsets of preconfigured downlink subframes being different;
   receiving, in the uplink subframe, uplink control information of a receiving status of the downlink data; and
   obtaining a HARQ-ACK codebook by decoding the uplink control information, the HARQ-ACK codebook comprising at least one sub-codebook, the at least one sub-codebook being in one-to-one correspondence with at least one subset of preconfigured downlink subframes of the N subsets of preconfigured downlink subframes, and the at least one subset including the downlink subframe F(i, j) in which the downlink data scheduled by the downlink scheduling information is sent.

18. The non-transitory computer-readable storage medium according to claim 17, wherein the sub-codebook comprises a HARQ-ACK for a scheduled downlink subframe in a subset of preconfigured downlink subframes corresponding to the sub-codebook, but does not comprise a HARQ-ACK for an unscheduled downlink subframe in the subset of preconfigured downlink subframes corresponding to the sub-codebook.

19. The non-transitory computer-readable storage medium according to claim 18, wherein the instructions which, when executed by a computer, cause the computer to carry out the steps of:
   sending, for the downlink subframe F(i, j) comprised in each subframe of the at least one subset of preconfigured downlink subframes, first indication information corresponding to the downlink subframe F(i, j), wherein the first indication information indicates a sequence number of the downlink subframe F(i, j), and the first indication information is sent in a same signaling with the downlink scheduling information,
   wherein a sub-codebook corresponding to a subset in the at least one subset of preconfigured downlink subframes is generated according to the sequence numbers indicated by the first indication information, according to the receiving status of the downlink data received in the downlink subframe F(i, j), and according to the bit quantity of the HARQ-ACK that needs to be fed back for the downlink subframe F(i, j).

20. The non-transitory computer-readable storage medium according to claim 19, wherein the instructions which, when executed by a computer, cause the computer to carry out the steps of:
   sending second indication information that is corresponding to the each subset of the at least one subset of preconfigured downlink subframes and that is used for the terminal to generate the sub-codebook, wherein the second indication information is sent in a same signaling with the first indication information, and the second indication information is used to indicate:
   a total quantity of scheduled downlink subframes that are in the subset of preconfigured downlink subframes comprising the downlink subframe F(i, j) and whose subframe numbers are j; or a total quantity of a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or a total quantity of scheduled downlink subframes in the subset of preconfigured downlink subframes comprising the downlink subframe F(i, j); or a total quantity of transport blocks transmitted in a scheduled downlink subframe that is in the subset of preconfigured downlink subframes comprising the downlink subframe F(i, j) and whose subframe number is j; or a total quantity of transport blocks transmitted in a scheduled downlink subframe whose subframe number is j and a downlink subframe before the downlink subframe whose subframe number is j, wherein the scheduled downlink subframe whose subframe number is j and the downlink subframe before the downlink subframe whose subframe number is j are in the subset of preconfigured downlink subframes comprising the downlink subframe F(i, j); or a total quantity of transport blocks transmitted in a scheduled downlink subframe in the subset of preconfigured downlink subframes comprising the downlink subframe F(i, j).

21. The non-transitory computer-readable storage medium according to claim 19, wherein the setting sequence comprises:
    a sequence between a carrier and a subframe; wherein
    the sequence between a carrier and a subframe comprises: carriers before subframes;
    the carrier sequence comprises: ascending order of carrier indexes; and
    the subframe sequence comprises: ascending order of subframe moments.

22. The non-transitory computer-readable storage medium according to claim 17, wherein the at least one sub-codebook is cascaded in the HARQ-ACK codebook.

* * * * *